United States Patent
Liu et al.

(10) Patent No.: US 11,418,112 B2
(45) Date of Patent: Aug. 16, 2022

(54) POWER CONVERTER

(71) Applicant: Richtek Technology Corporation, Zhubei (TW)

(72) Inventors: Kuo-Chi Liu, Hsinchu (TW); Chung-Lung Pai, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 35 days.

(21) Appl. No.: 17/210,434

(22) Filed: Mar. 23, 2021

(65) Prior Publication Data

US 2021/0328507 A1 Oct. 21, 2021

Related U.S. Application Data

(60) Provisional application No. 63/012,684, filed on Apr. 20, 2020.

(30) Foreign Application Priority Data

Sep. 15, 2020 (TW) .................................. 109131749

(51) Int. Cl.
*H02M 3/07* (2006.01)
*H02M 1/00* (2006.01)

(52) U.S. Cl.
CPC ........... *H02M 3/07* (2013.01); *H02M 1/0058* (2021.05)

(58) Field of Classification Search
CPC ....... H02M 3/07; H02M 1/0058; H02M 3/158
See application file for complete search history.

(56) References Cited

U.S. PATENT DOCUMENTS

| 9,917,517 | B1 | 3/2018 | Jiang et al. | |
| 11,165,335 | B2* | 11/2021 | Sblano | H02M 3/1584 |
| 2011/0175591 | A1* | 7/2011 | Cuk | H02M 3/158 323/311 |
| 2021/0367520 | A1* | 11/2021 | Liu | H02M 1/0009 |

* cited by examiner

*Primary Examiner* — Adolf D Berhane
*Assistant Examiner* — Afework S Demisse
(74) *Attorney, Agent, or Firm* — Tung & Associates

(57) ABSTRACT

A power converter includes: capacitors; switches coupled to the corresponding capacitors, wherein the switches switch electrical connection relationships of corresponding capacitors according to operation signals; one or more charging inductors connected in series to one or more corresponding capacitors; one or more discharging inductors connected in series to one or more corresponding capacitors. In a charging process, by switching the switches, a series connection of the capacitors and the corresponding charging inductor(s) is formed between the input voltage and the output voltage, so as to form a charging path. In a discharging process, by switching the switches, each capacitor and one of the corresponding discharging inductors are connected in series between the output voltage and ground voltage level, so as to form plural discharging paths. The charging process and the discharging process are arranged in alternating and repetitive manner, to convert the input voltage to the output voltage.

19 Claims, 16 Drawing Sheets

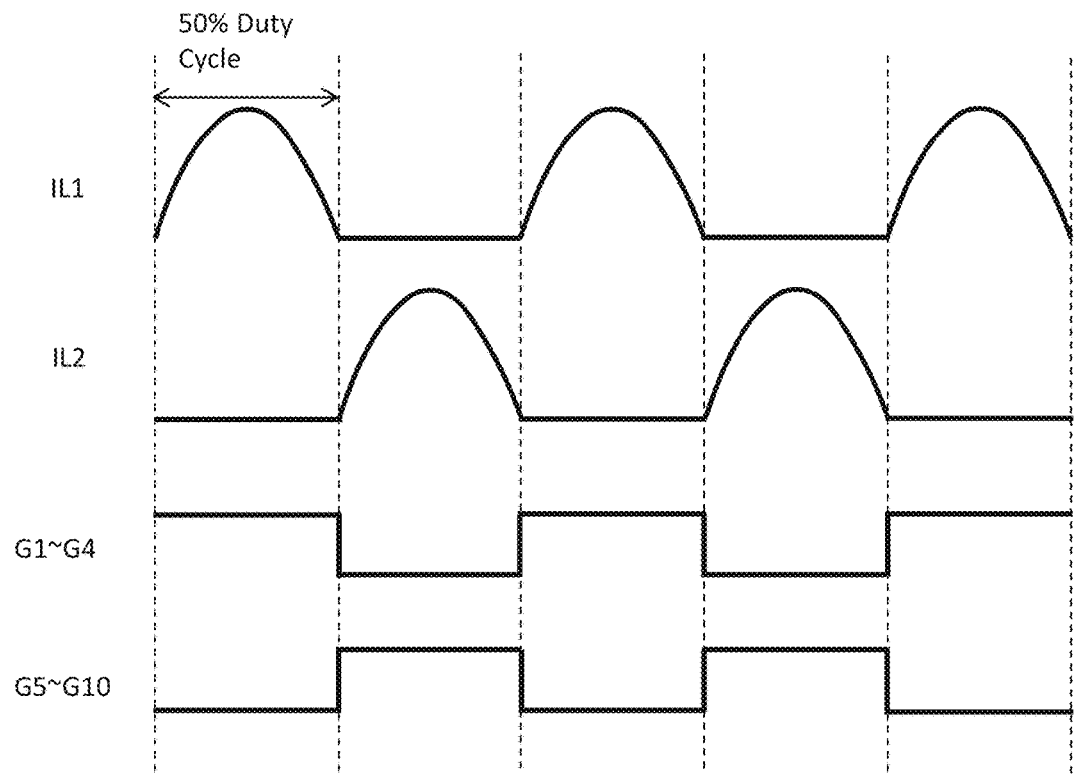
Fig. 11A
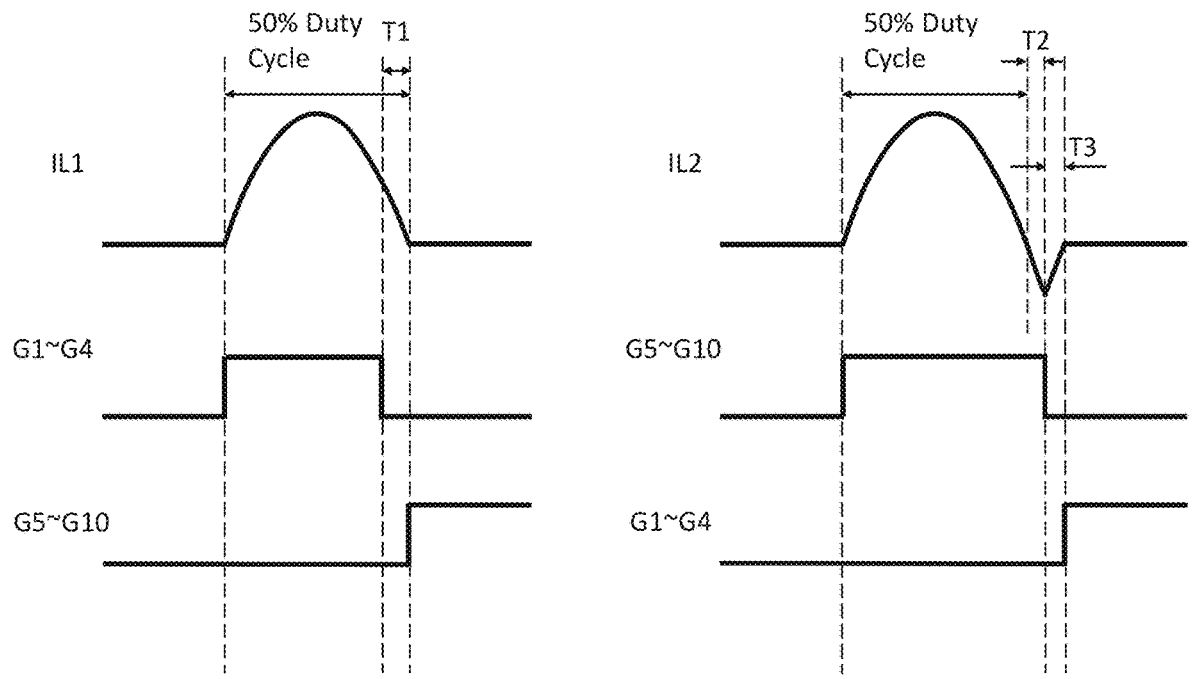
Fig. 11B
Fig. 11C

POWER CONVERTER

CROSS REFERENCE

The present invention claims priority to U.S. 63/012,684 filed on Apr. 20, 2020 and claims priority to TW 109131749 filed on Sep. 15, 2020.

BACKGROUND OF THE INVENTION

Field of Invention

The present invention relates to a power converter; particularly, it relates to such power converter capable of converting an input voltage to an output voltage by switching electrical connection relationships among capacitors and inductors.

Description of Related Art

Please refer to FIG. 1, which shows a schematic diagram of a conventional power converter. Under a charging operation, switches Q1, Q3, Q5, Q8 and Q9 are ON, whereas, switches Q2, Q4, Q6, Q7 and Q10 are OFF, so that a series connection of a capacitor C1 and an inductor L1 is formed between an input voltage VIN and an output voltage VOUT and a series connection of a capacitor C2, a capacitor C3 and an inductor L2 is formed between the ground voltage level and the output voltage VOUT. On the other hand, under a discharging operation, switches Q2, Q4, Q6, Q7 and Q10 are ON, whereas, switches Q1, Q3, Q5, Q8 and Q9 are OFF, so that a series connection of the inductor L1, the capacitor C1 and the capacitor C2 is formed between the ground voltage level and the output voltage VOUT and a series connection of the inductor L2 and the capacitor C3 is formed between the ground voltage level and the output voltage VOUT. It is required for the capacitors of this conventional power converter to withstand a relatively higher rated voltage. For example, the DC bias voltage of the capacitor C1 is three times the level of the output voltage VOUT (i.e., Vc1=3VOUT); the DC bias voltage of the capacitor C2 is two times the level of the output voltage VOUT (i.e., Vc2=2VOUT); the DC bias voltage of the capacitor C3 is equal to the level of the output voltage VOUT (i.e., Vc3=VOUT). Because the required DC bias voltage levels of the capacitors are relatively higher, it is required for this conventional power converter to utilize capacitors having a larger size. Additionally, the capacitance of a capacitor usually decreases as its DC bias voltage increases. In a case where a level of the input voltage VIN ranges between 36V and 76V, the DC bias voltage level of the capacitor C1 will range between 27V and 57V. The wide variation range of the DC bias voltage level leads to the wide variation range of the capacitance of the capacitor; as a result, the resonant frequency of this conventional power converter will vary greatly, resulting in a larger switching power loss, and a complicated control mechanism is required for better power conversion efficiency, but still within its constraints. Moreover, the voltage conversion ratio of the input voltage to the output voltage of this conventional power converter is limited to be 4:1 or 2:1; that is, this conventional power converter cannot perform voltage conversion of other voltage conversion ratios, such as 3:1.

Please refer to FIG. 2, which shows a schematic diagram of another conventional power converter. The conventional power converter of FIG. 2 is an interleaving type power converter based on the circuit of FIG. 1. Under a first charging operation, switches Q1, Q3, Q5, Q8 and Q9 are ON, whereas, switches Q2, Q4, Q6, Q7 and Q10 are OFF, so that a series connection of a capacitor C1 and an inductor L1 is formed between an input voltage VIN and an output voltage VOUT and a series connection of a capacitor C2, a capacitor C3 and an inductor L2 is formed between the ground voltage level and the output voltage VOUT. Under a first discharging operation, switches Q2, Q4, Q6, Q7 and Q10 are ON, whereas, switches Q1, Q3, Q5, Q8 and Q9 are OFF, so that a series connection of the inductor L1, the capacitor C1 and the capacitor C2 is formed between the ground voltage level and the output voltage VOUT and a series connection of the inductor L2 and the capacitor C3 is formed between the ground voltage level and the output voltage VOUT. Further, under a second charging operation, switches Q11, Q13, Q15, Q18 and Q19 are ON, whereas, switches Q12, Q14, Q16, Q17 and Q20 are OFF, so that a series connection of a capacitor C4 and an inductor L3 is formed between the input voltage VIN and the output voltage VOUT and a series connection of a capacitor C5, a capacitor C6 and an inductor L4 is formed between the ground voltage level and the output voltage VOUT. Under a second discharging operation, switches Q12, Q14, Q16, Q17 and Q20 are ON, whereas, switches Q11, Q13, Q15, Q18 and Q19 are OFF, so that a series connection of the inductor L3, the capacitor C4 and the capacitor C5 is formed between the ground voltage level and the output voltage VOUT and a series connection of the inductor L4 and the capacitor C6 is formed between the ground voltage level and the output voltage VOUT. The first charging operation and the second discharging operation are performed simultaneously, while, the first discharging operation and the second charging operation are performed simultaneously. Same as the conventional power converter of FIG. 1, because the DC bias voltage level of the capacitors in the conventional power converter of FIG. 2 is relatively higher, it is required for this conventional power converter of FIG. 2 to withstand a relatively higher rated voltage and utilize capacitors having a larger size. Besides, variations of the capacitances lead to variations of the resonant frequency, resulting in a larger switching power loss. Hence, this conventional power converter of FIG. 2 also requires a complicated control mechanism for better power conversion efficiency within its constraints.

In view of the above, the present invention proposes an innovated power converter to overcome the drawbacks in the prior art.

SUMMARY OF THE INVENTION

From one perspective, the present invention provides a power converter, which is configured to operably convert an input voltage to an output voltage; the power converter comprising: a plurality of first capacitors; a plurality of first switches, which are coupled to the plurality of first capacitors, wherein the plurality of first switches switch electrical connection relationships of the plurality of first capacitors according to corresponding first operation signals; at least one charging inductor, which is connected in series to at least a corresponding one of the plurality of first capacitors; and at least one discharging inductor, which is connected in series to at least a corresponding one of the plurality of first capacitors; wherein in a first charging process, by switching the first switches, a series connection of each first capacitor and each charging inductor is formed between the input voltage and the output voltage, so as to form one single first charging path; wherein in a first discharging process, by switching the first switches, each first capacitor and one of the at least one discharging inductor are connected in series between the output voltage and a ground voltage level, so as to form a plurality of first discharging paths; wherein the first charging process and the first discharging process are arranged in alternating and repetitive manner, so as to convert the input voltage to the output voltage.

In one embodiment, the at least one charging inductor includes a plurality of charging inductors, which are respectively connected in series to the plurality of first capacitors, wherein in the first charging process, by switching the first switches, a series connection of each first capacitor and each charging inductor is formed between the input voltage and the output voltage, so as to form the single first charging path; wherein in the first discharging process, the plurality of charging inductors function as the plurality of discharging inductors, so that by switching the first switches, each first capacitor and a corresponding one of the discharging inductors are correspondingly connected in series between the output voltage and the ground voltage level, so as to form the plurality of first discharging paths; wherein the plurality of first discharging paths are connected in parallel among one another.

In one embodiment, the at least one charging inductor is one single charging inductor and the at least one discharging inductor is one single discharging inductor, wherein in the first discharging process, by switching the first switches, the plurality of first capacitors form a parallel connection which is connected in series to the single discharging inductor In one embodiment, the power converter further comprises: a plurality of second capacitors; a plurality of second switches, which are coupled to the plurality of second capacitors, wherein the plurality of second switches switch electrical connection relationships of the plurality of second capacitors according to corresponding second operation signals; wherein the at least one charging inductor is connected in series to at least one of the plurality of second capacitors; and wherein the at least one discharging inductor is connected in series to at least one of the plurality of second capacitors; wherein in a second charging process, by switching the second switches, a series connection of the plurality of the second capacitors and the at least one charging inductor is formed between the input voltage and the output voltage, so as to form a second charging path; wherein in a second discharging process, by switching the second switches, each second capacitor and one of the at least one discharging inductor are correspondingly connected in series between the output voltage and a ground voltage level, so as to form a plurality of second discharging paths; wherein the second charging process and the second discharging process are arranged in alternating and repetitive manner, so as to convert the input voltage to the output voltage; wherein when the power converter is in the first charging process, the power converter executes the second discharging process; wherein when the power converter is in the first discharging process, the power converter executes the second charging process.

In one embodiment, the power converter further comprises: a previous stage converter including a previous stage inductor, wherein the previous stage inductor is configured to operably function as the charging inductor.

In one embodiment, the previous stage converter includes: a buck converter, a boost converter, a buck-boost converter, an inverting converter or an inverting-boost converter.

In one embodiment, the first charging process has a first charging resonant frequency, whereas, the first discharging process has a first discharging resonant frequency, and wherein the first charging resonant frequency is identical to the first discharging resonant frequency.

In one embodiment, the second charging process has a second charging resonant frequency, whereas, the second discharging process has a second discharging resonant frequency, and wherein the second charging resonant frequency is identical to the second discharging resonant frequency.

In one embodiment, a duration period of the first charging process is equal to a duration period of the first discharging process, so that a zero current switching of soft switching is achieved.

In one embodiment, a duration period of the second charging process is equal to a duration period of the second discharging process, so that a zero current switching of soft switching is achieved.

In one embodiment, a zero voltage switching of soft switching is achieved through adjusting a duration period of the first charging process.

In one embodiment, a zero voltage switching of soft switching is achieved through adjusting a duration period of the second charging process.

In one embodiment, a zero voltage switching of soft switching is achieved through adjusting a duration period of the first discharging process.

In one embodiment, a zero voltage switching of soft switching is achieved through adjusting a duration period of the second discharging process.

In one embodiment, the power converter is a bi-directional power converter.

In one embodiment, a voltage conversion ratio of the input voltage to the output voltage of the power converter is adjustable to be 4:1, 3:1 or 2:1.

In one embodiment, a duration period of the first charging process does not overlap with a duration period of the first discharging process.

In one embodiment, a duration period of the second charging process does not overlap with a duration period of the second discharging process.

In one embodiment, the power converter further comprises a controller, which is coupled to the plurality of first switches, wherein the controller is configured to operably generate the first operation signals.

Advantages of the present invention include that: the present invention can reduce the number of the inductors, and the present invention can adopt a capacitor have a relatively smaller size to function as a resonant capacitor.

Further advantages of the present invention include that: the present invention can reduce voltage stress, and the present invention have an improved dynamic load transient response, an improved current voltage balance performance and also a stable resonant frequency.

Yet further advantage of the present invention include that: the control mechanism is less complicated for the present invention to achieve soft switching such as zero current switching (ZCS) or zero voltage switching (ZVS). Besides, the present invention can adjust the voltage conversion ratio in a more flexible fashion. Moreover, the present invention has a broader application scope for the input voltage. Furthermore, as compared to the prior art, the present invention can more precisely control the output voltage to fall within a more accurate range.

The objectives, technical details, features, and effects of the present invention will be better understood with regard to the detailed description of the embodiments below, with reference to the attached drawings.

BRIEF DESCRIPTION OF THE DRAWINGS

FIGS. 11A-11C illustrate waveform diagrams of operation signals and corresponding inductor currents corresponding to a charging process and a discharging process.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
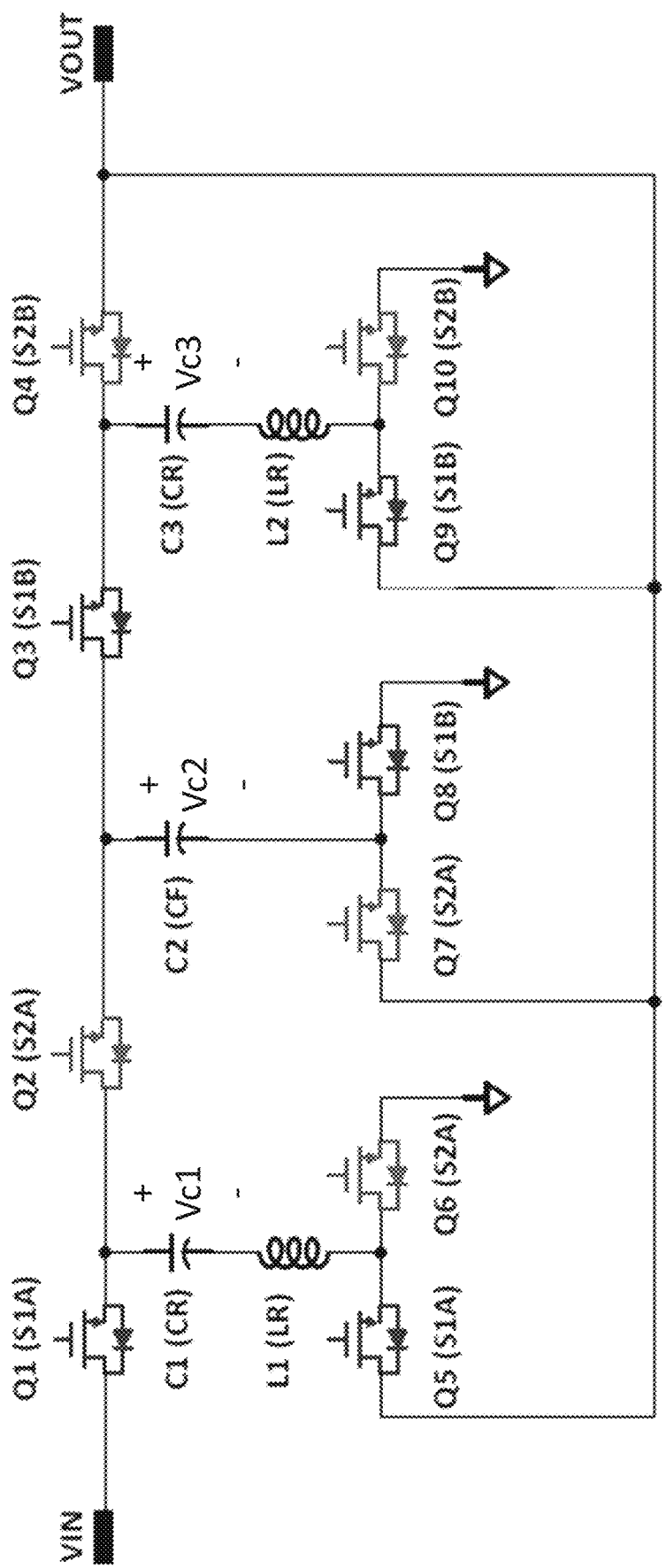
FIG. 1 shows a schematic diagram of a conventional power converter.
Figure 2:
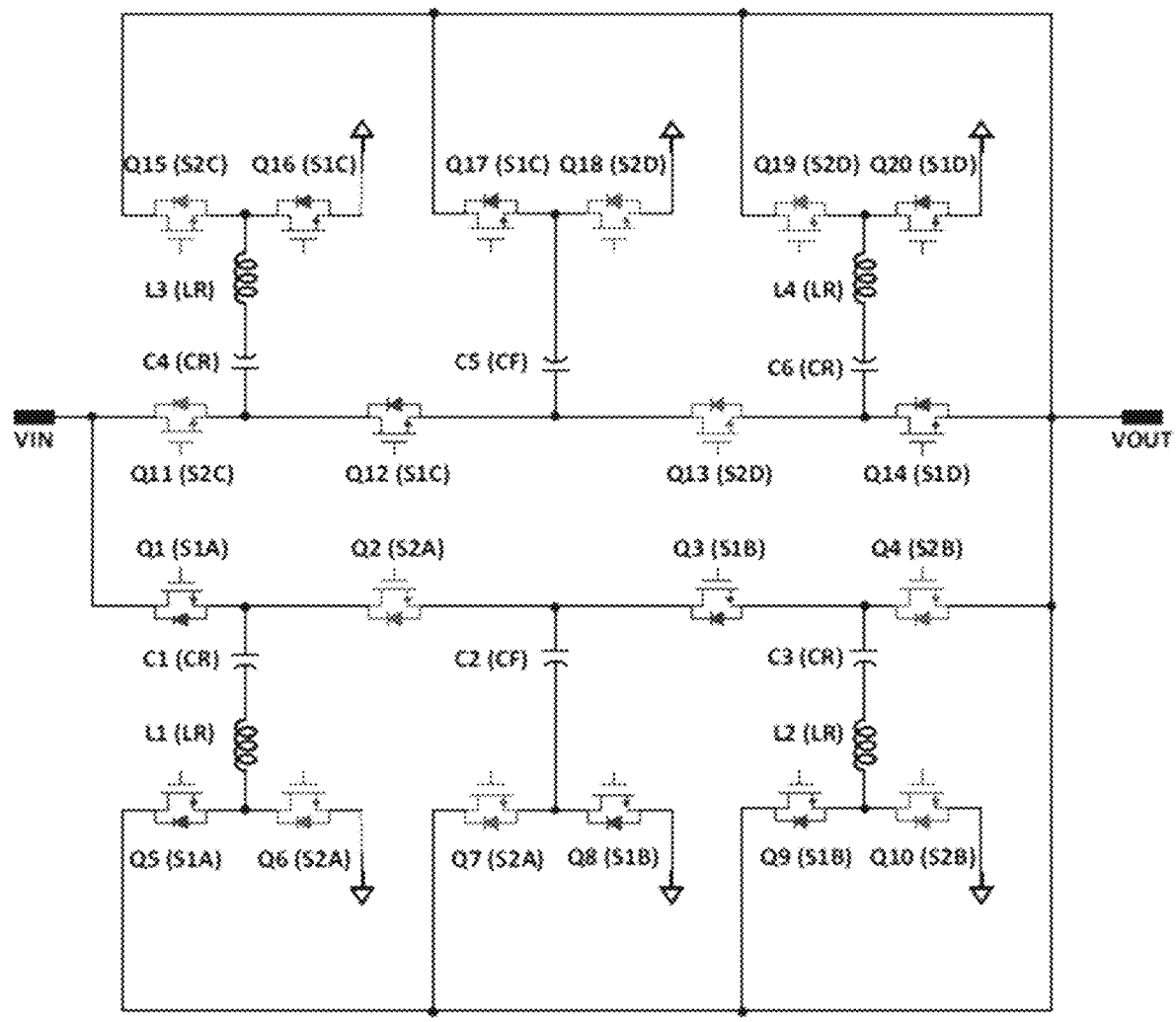
FIG. 2 shows a schematic diagram of another conventional power converter.
Figure 3:
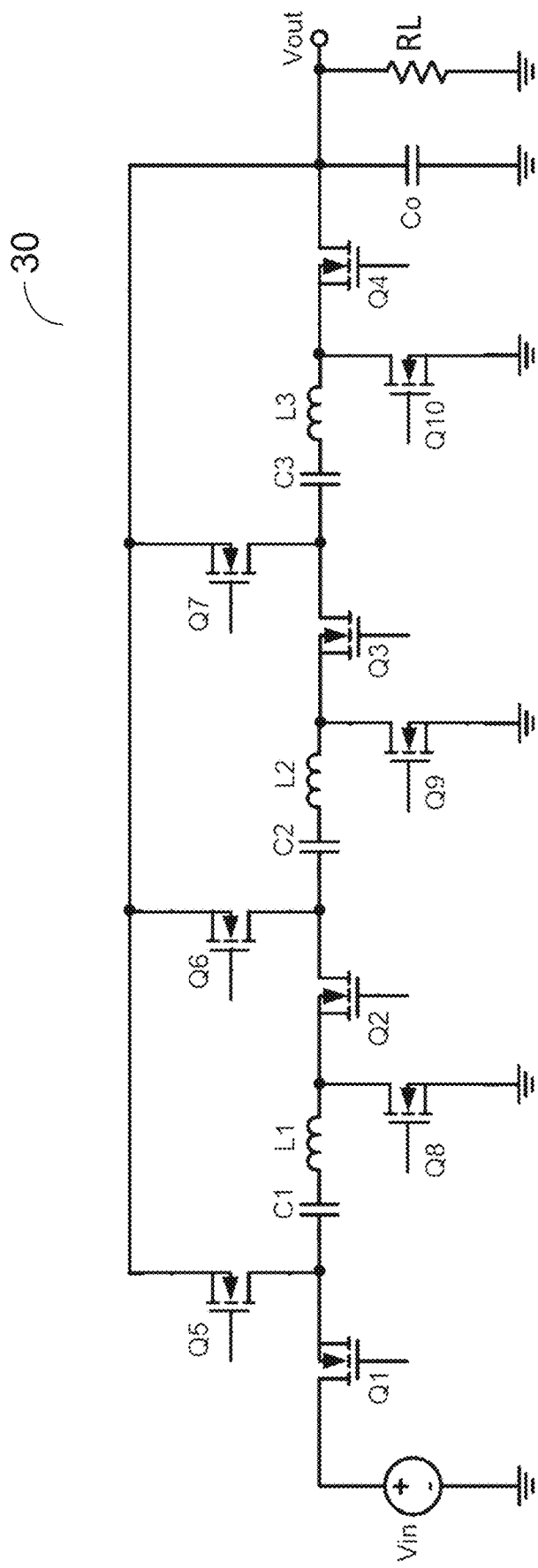
FIG. 3 shows a schematic circuit diagram of a power converter according to an embodiment of the present invention.

Please refer to FIG. 3, which shows a schematic circuit diagram of a power converter according to an embodiment of the present invention. As shown in FIG. 3, the power converter 30 of the present invention comprises: first capacitors C1, C2 and C3, first switches Q1, Q2, Q3, Q4, Q5, Q6, Q7, Q8, Q9 and Q10, and charging inductors L1, L2 and L3. The first switches Q1, Q2 and Q3 are connected in series to the corresponding first capacitors C1, C2 and C3, respectively. Certainly, it should be understood that the implementation of the number of the capacitors of the power converter 30 as three in the above-mentioned preferred embodiment is only an illustrative example, but not for limiting the broadest scope of the present invention. In other embodiments, it is also practicable and within the scope of the present invention that the number of the capacitors of the power converter 30 can be any plural number other than three. Likely, the number of the inductors of the power converter 30 also can be any plural number other than three. It should be understood that the number of a device in any embodiment of the present invention is only an illustrative example, but not for limiting the broadest scope of the present invention.

As shown in FIG. 3, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the charging inductor L1. One end of the first switch Q9 is coupled to a node between the first switch Q3 and the charging inductor L2. One end of the first switch Q10 is coupled to a node between the first switch Q4 and the charging inductor L3. As shown in FIG. 3, the other ends of the first switches Q5-Q7 are commonly electrically connected to the output voltage Vout. The other ends of the first switches Q8-Q10 are commonly coupled to the ground voltage level. The first switch Q4 is coupled between the charging inductor L3 and the output voltage Vout. One end of the first switch Q1 is coupled to input voltage Vin. (A switch is regarded as a two-end device in this specification. Its control terminal is not regarded as an "end".)

The first switches Q1-Q10 can switch electrical connection relationships between the first capacitors C1-C3 with the charging inductors L1-L3 according to corresponding operation signals. In a first charging process, the first switches Q1-Q4 are turned ON, whereas, the first switches Q5-Q10 are turned OFF, so that a series connection of the first capacitors C1-C3 and the charging inductors L1-L3 is formed between the input voltage Vin and the output voltage Vout, so as to form a first charging path. In a first discharging process, the charging inductors L1-L3 function also as the discharging inductors L1-L3; the first switches Q5-Q10 are turned ON, whereas, the first switches Q1-Q4 are turned OFF. As a result, a series connection of the first capacitor C1 and the discharging inductors L1 is formed between the output voltage Vout and the ground voltage; a series connection of the first capacitor C2 and the discharging inductors L2 is formed between the output voltage Vout and the ground voltage; and a series connection of the first capacitor C3 and the discharging inductors L3 is formed between the output voltage Vout and the ground voltage, so that plural first discharging paths in parallel are formed. It is noteworthy that, the above-mentioned first charging process and the above-mentioned first discharging process are performed at different periods in an alternating manner. That is, the above-mentioned first charging process and the above-mentioned first discharging process are not performed at the same time. In one embodiment, the first charging process and the first discharging process are arranged in alternating and repetitive manner, so as to convert the input voltage Vin to the output voltage Vout. In this embodiment, the DC bias voltages of the first capacitors C1, C2 and C3 all are Vo, so the first capacitors C1, C2 and C3 of this embodiment will only need to withstand a relatively lower rated voltage. Hence, this embodiment can utilize capacitors having a smaller size.

In one embodiment, the duration period of the above-mentioned first charging process is substantially equal to a specific ratio of a duty cycle period. For example, the duration period of the above-mentioned first charging process can be substantially equal to, for example but not limited to, 50% of the duty cycle period, whereby the first switch switches at a time point where the current flowing through the first switch is at a relatively lower level of its positive half wave, so that soft switching can be achieved. In preferred one embodiment, a zero current switching (ZCS) can be achieved.

Note that, although it is preferred for the duration period of the first charging process to be equal to the duration period of the first discharging process (i.e., the duration period of the first charging process and the duration period of the first discharging process are each equal to 50% of the duty cycle period), so that a zero current switching of soft switching can be achieved, however due to non-idealities caused by for example imperfection of components or imperfect matching among components, the duration period of the first charging process may not be equal to exactly 50% of the duty cycle period, but just close to 50% of the duty cycle period. In other words, according to the present invention, a certain level of error between the duration period of the first charging process and 50% of the duty cycle period is acceptable, and therefore the term "substantially" is used in this specification to mean that an insignificant error within a tolerable range is acceptable.

In one embodiment, the above-mentioned specific ratio is correlated with the resonant frequency. In one embodiment, the above-mentioned first charging process has a first charging resonant frequency, whereas, the above-mentioned first discharging process has a first discharging resonant frequency. In one embodiment, preferably, the above-mentioned first charging resonant frequency is identical to the above-mentioned first discharging resonant frequency.

In one embodiment, the above-mentioned power converter 30 can be a bi-directional power converter. As one of average skill in the art readily understands, "bi-directional power converter" refers to a power converter whose input terminal (the input voltage Vin) and output terminal (the output voltage Vout) are interchangeable. That is, in the embodiment shown in FIG. 3, the power converter 30 can convert the output voltage Vout to the input voltage Vin. In one embodiment, the voltage conversion ratio of the input voltage Vin to the output voltage Vout of the above-mentioned power converter 30 is adjustable to 4:1, 3:1 or 2:1. More specifically, the power converter 30 in this embodiment has a voltage conversion ratio of 4:1 (input voltage Vin to output voltage Vout). However, through controlling ON/OFF of the first switches Q1-Q10, the voltage conversion ratio of the power converter 30 can be changed to 3:1. For example, through controlling the first switch Q7 to be always ON while at the same time controlling the first switches Q4 and Q10 to be always OFF, the voltage conversion ratio of the power converter 30 will be changed to 3:1. Likely, the voltage conversion ratio of the power converter 30 can be changed to 2:1 by properly controlling ON/OFF of the first switches Q1-Q10. In one embodiment, the first capacitor C1 and the inductor L1 have a resonant frequency, which can be represented by the following equation:

$$fr1 = \frac{1}{2\pi\sqrt{L1C1}};$$

the first capacitor C2 and the inductor L2 have a resonant frequency, which can be represented by the following equation:

$$fr2 = \frac{1}{2\pi\sqrt{L2C2}};$$

the first capacitor C3 and the inductor L3 have a resonant frequency, which can be represented by the following equation:

$$fr3 = \frac{1}{2\pi\sqrt{L3C3}}.$$

Let it be assumed here that C1=C2=C3=Cr and L1=L2=L3=Lr, both the first charging resonant frequency and the first discharging resonant frequency of the power converter 30 shown in FIG. 3 are fr, which can be represented by the following equation:

$$fr = \frac{1}{2\pi\sqrt{LrCr}}.$$

In one embodiment, the capacitances of the first capacitors C1, C2 and C3 can be different from one another, while the inductances of the inductors L1, L2 and L3 can be different among one another, as long as a situation where L1C1=L2C2=L3C3 is fulfilled.

Figure 4A:
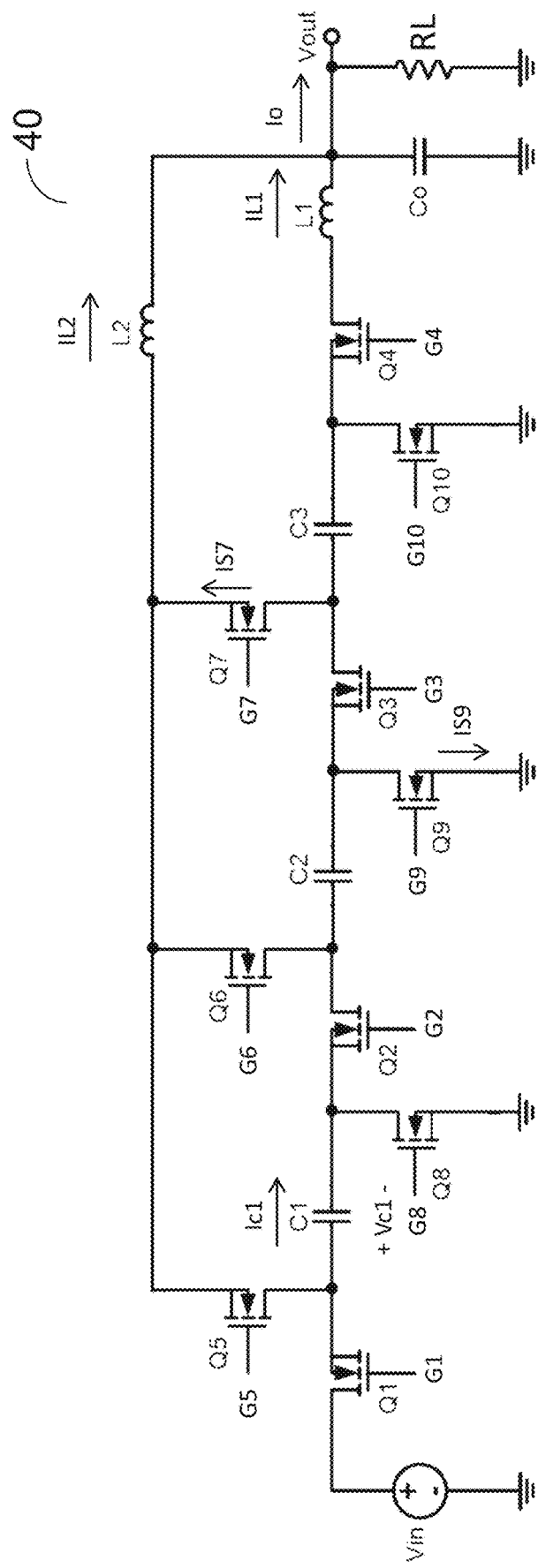
FIG. 4A shows a schematic circuit diagram of a power converter according to another embodiment of the present invention.
Figure 4B:
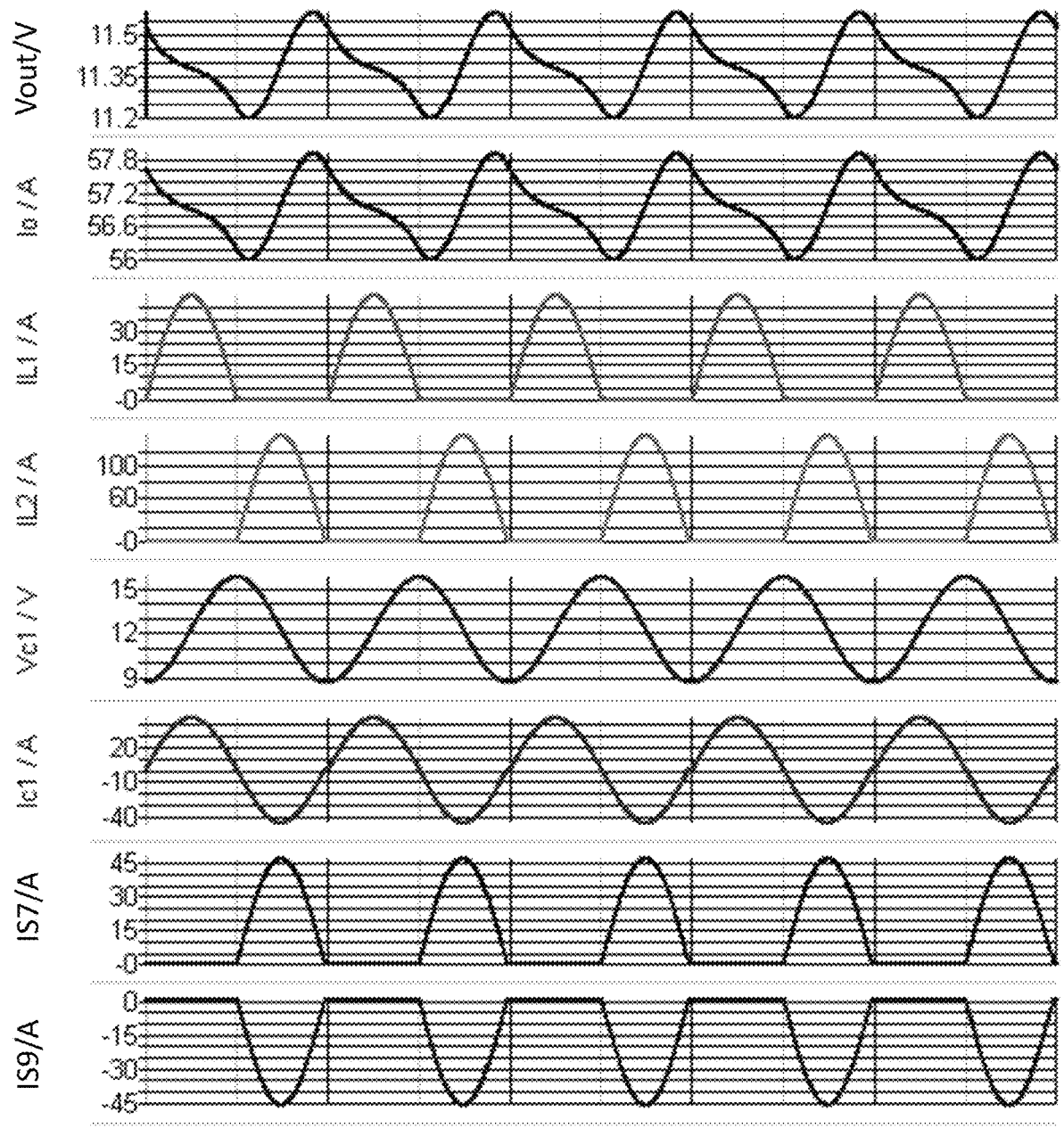
FIG. 4B illustrates waveform diagrams of relevant signals related to the operation of FIG. 4A.

Please refer to FIG. 4A and FIG. 4B. FIG. 4A shows a schematic circuit diagram of a power converter according to another embodiment of the present invention. FIG. 4B illustrates waveform diagrams of relevant signals related to the operation of FIG. 4A. This embodiment of FIG. 4A is different from the previous embodiment of FIG. 3 in that: this embodiment comprises plural capacitors but they share one charging inductor and one discharging inductor. In this embodiment, there is only one charging inductor and only one discharging inductor regardless how many number of the capacitors is. This embodiment provides a benefit of reducing the number of the capacitors. As shown in FIG. 4A, the power converter 40 of the present invention comprises: first capacitors C1, C2 and C3, first switches Q1, Q2, Q3, Q4, Q5, Q6, Q7, Q8, Q9 and Q10, a charging inductor L1 and a discharging inductor L2. The first switches Q1, Q2 and Q3 are connected in series to the corresponding first capacitors C1, C2 and C3, respectively. The first switch Q4 is connected in series to the charging inductor L1. Certainly, it should be understood that the implementation of the number of the capacitors of the power converter 40 as three in the above-mentioned preferred embodiment is only an illustrative example, but not for limiting the broadest scope of the present invention. In other embodiments, it is also practicable and within the scope of the present invention that the number of the capacitors of the power converter 40 can be any plural number other than three. It should be understood that the number of a device in the above-mentioned preferred embodiment is only an illustrative example, but not for limiting the broadest scope of the present invention.

As shown in FIG. 4A, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 4A, the other ends of the first switches Q5-Q7 are commonly electrically connected to a node which is connected to the discharging inductor L2. The other ends of the switches Q8-Q10 are commonly coupled to the ground voltage level. The other end of the charging inductor L1 and the discharging inductor L2 are commonly coupled to the output voltage Vout. The other end of the first switch Q1 is coupled to input voltage Vin.

The first switches Q1-Q10 can switch electrical connection relationships between the first capacitors C1-C3 with the charging inductor L1 and the discharging inductor L2 according to corresponding operation signals. In a first charging process, the first switches Q1-Q4 are turned ON, whereas, the first switches Q5-Q10 are turned OFF, so that a series connection of the first capacitors C1-C3 which is further connected in series to the charging inductor L1 is formed between the input voltage Vin and the output voltage Vout, so as to form a first charging path. In a first discharging process, the first switches Q5-Q10 are turned ON, whereas, the first switches Q1-Q4 are turned OFF, so that a parallel connection of the capacitors C1, C2 and C3 is connected in series to the discharging inductor L2, so as to form plural first discharging paths. It is noteworthy that, in one embodiment, the above-mentioned first charging process and the above-mentioned first discharging process are performed at different periods in an alternating manner. That is, the above-mentioned first charging process and the above-mentioned first discharging process are not performed at the same time. In this embodiment, the DC bias voltages of the capacitors C1, C2 and C3 all are Vo. Thus, the first capacitors C1, C2 and C3 of this embodiment will only need to withstand a relatively lower rated voltage. Hence, this embodiment can utilize capacitors having a smaller size.

In one embodiment, the duration period of the above-mentioned first charging process is substantially equal to a specific ratio of duty cycle period. For example, the duration period of the above-mentioned first charging process is substantially equal to, for example but not limited to, 50% of the duty cycle period. Thus, the first switch can be switched at a time point where the current flowing through the first switch is at a very low level of its positive half wave, so that soft switching can be achieved. In one embodiment, a zero current switching (ZCS) can be achieved.

In one embodiment, the duration period of the above-mentioned first charging process is smaller than a specific ratio of duty cycle period by a first predetermined period. For example, the duration period of the above-mentioned first charging process is smaller than 50% of the duty cycle period by a first predetermined period. Thus, after the first switches Q1-Q4 have been turned OFF, a little amount of current remains, which flows through the charging inductor L1 to take away accumulated charges stored in a parasitic capacitor of the switch Q10 via the parasitic diode of the first switch Q4, so that the voltage across the first switch Q10 can be reduced, thus achieving soft switching. In one embodiment, a zero voltage switching (ZVS) can be achieved by adjusting the first predetermined period.

In one embodiment, the duration period of the above-mentioned first discharging process is larger than a specific ratio of duty cycle period by a second predetermined period. For example, the duration period of the above-mentioned first discharging process is larger than 50% of the duty cycle period by a second predetermined period. Thus, during the delayed turned-OFF period of the first switches Q5-Q10, a negative current of the discharging inductor L2 will flow through a parasitic diode of the first switch Q5, to charge a parasitic capacitor of the first switch Q1. As a result, the voltage across the first switch Q1 will be reduced, for achieving soft switching. In one embodiment, a zero voltage switching (ZVS) can be achieved through adjusting the second predetermined period. In another embodiment, a zero voltage switching (ZVS) of soft switching can be achieved through adjusting the turned-OFF time point of the switch to be earlier or delayed, depending upon practical needs.

In one embodiment, the above-mentioned specific ratio is correlated with the resonant frequency. In one embodiment, the above-mentioned first charging process has a first charging resonant frequency, whereas, the above-mentioned first discharging process has a first discharging resonant frequency. In one embodiment, preferably, the above-mentioned first charging resonant frequency is identical to the above-mentioned first discharging resonant frequency.

In one embodiment, the above-mentioned power converter 40 can be a bi-directional power converter. In one embodiment, a voltage conversion ratio of the input voltage Vin to the output voltage Vout of the above-mentioned power converter 40 is adjustable to be 4:1, 3:1 or 2:1.

In one embodiment, the first charging resonant frequency of the power converter 40 shown in FIG. 4A is denoted as fr4, which can be represented by the following equation:

$$fr4 = \frac{1}{2\pi \sqrt{L1 \times (C1//C2//C3)}};$$

the first discharging resonant frequency of the power converter 40 shown in FIG. 4A is denoted as fr5, which can be represented by the following equation:

$$fr5 = \frac{1}{2\pi \sqrt{L2 \times (C1 + C2 + C3)}}.$$

If it is intended to fulfill a condition where fr4=fr5 and let it be assumed that C1=C2=C3, then the inductance of the inductor L2 and the inductance of the inductor L1 should comply with a relationship which is represented by the following equation:

$$L2 = \frac{1}{9}L1.$$

In one embodiment, a duration period of the first charging process does not overlap with a duration period of the first discharging process. In one embodiment, a duration period of the second charging process does not overlap with a duration period of the second discharging process.

Please refer to FIG. 4B, which illustrates waveform diagrams of relevant signals related to the operation of FIG. 4A. FIG. 4B shows the waveform diagrams of the output voltage Vout, the output current Io, the charging inductor current IL1, the discharging inductor current IL2, a DC bias voltage Vc1 of the first capacitor C1, a current Ic1 of the first capacitor C1, a current IS7 of the first switch Q7 and a current IS9 of the first switch Q9. In this embodiment, the first charging resonant frequency is equal to the first discharging resonant frequency. The duration period of the first charging process is substantially equal to 50% of the duty cycle period.

Figure 5:
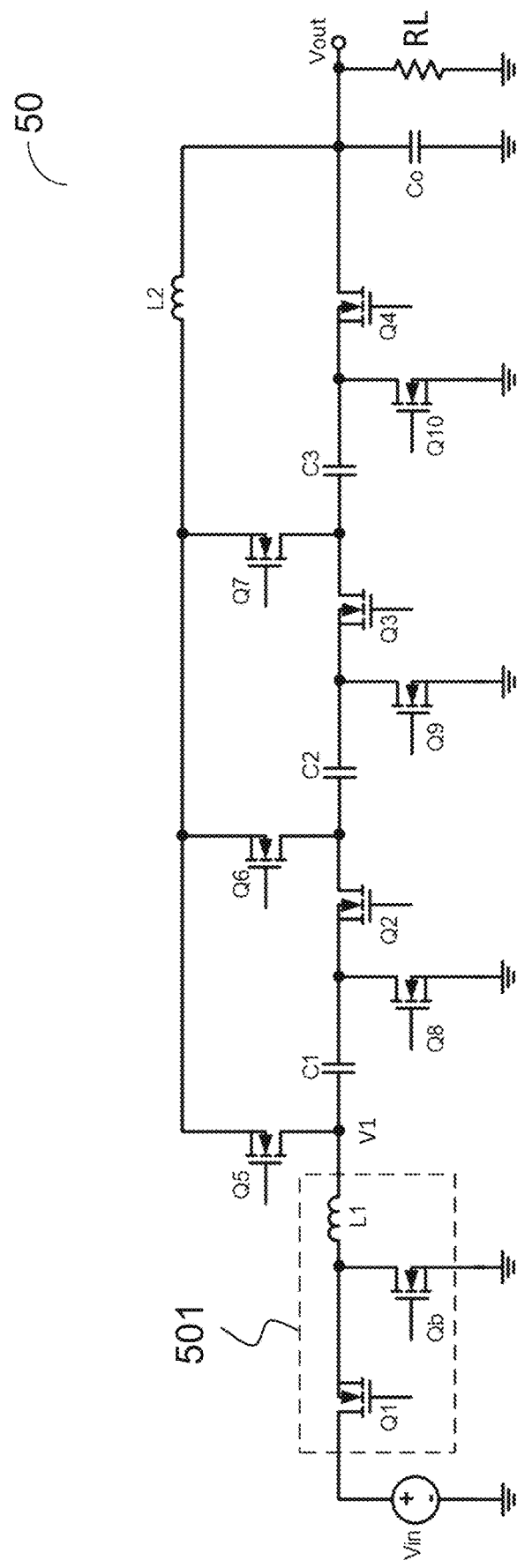
FIG. 5 shows a schematic circuit diagram of a power converter according to another embodiment of the present invention.

Please refer to FIG. 5, which shows a schematic circuit diagram of a power converter according to another embodiment of the present invention. This embodiment of FIG. 5 is different from the previous embodiment of FIG. 4A in that: a charging inductor of this embodiment is moved to a position where it lies between an input voltage Vin and a first capacitor C1. Besides, this embodiment employs a previous stage inductor in a previous stage converter 501 to function as a charging inductor L1. Thus, this embodiment can reduce the number of the inductors. Moreover, because the previous stage converter 501 includes a switch, this switch in the previous stage converter 501 can function as the first switch Q1. As shown in FIG. 5, the power converter 50 of the present invention comprises: first capacitors C1, C2 and C3, first switches Q1, Q2, Q3, Q4, Q5, Q6, Q7, Q8, Q9 and Q10, a charging inductor L1 and a discharging inductor L2. The first switches Q2, Q3 and Q4 are connected in series to the corresponding first capacitors C1, C2 and C3, respectively. The switch Q1 is connected in series to the charging inductor L1. Certainly, it should be understood that the implementation of the number of the capacitors of the power converter 50 as three in the above-mentioned preferred embodiment is only an illustrative example, but not for limiting the broadest scope of the present invention. In other embodiments, it is also practicable and within the scope of the present invention that the number of the capacitors of the power converter 50 can be any plural number other than three. It should be understood that the number of a device in the above-mentioned preferred embodiment is only an illustrative example, but not for limiting the broadest scope of the present invention.

As shown in FIG. 5, one end of the first switch Q5 is coupled to a node between the charging inductor L1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 5, the other ends of the first switches Q5-Q7 are commonly electrically connected to a node which is connected to the discharging inductor L2. The other ends of the switches Q8-Q10 are commonly coupled to the ground voltage level. The other end of the discharging inductor L2 is coupled to the output voltage Vout. The other end of the switch Q1 is coupled to the input voltage Vin. The other end of the charging inductor L1 is coupled to the first capacitor C1.

The first switches Q1-Q10 can switch electrical connection relationships between the first capacitors C1-C3 with the charging inductor L1 and the discharging inductor L2 according to corresponding first operation signals. In a first charging process, the first switches Q1-Q4 are turned ON, whereas, the first switches Q5-Q10 are turned OFF, so that a series connection of the capacitors C1-C3 which is connected in series to the charging inductor L1 is formed between the input voltage Vin and the output voltage Vout, so as to form a first charging path. In a first discharging process, the first switches Q5-Q10 are turned ON, whereas, the first switches Q1-Q4 are turned OFF, so that a parallel connection of the first capacitors C1, C2 and C3 is connected in series to the discharging inductor L2, so as to form plural first discharging paths. It is noteworthy that, in one embodiment, the above-mentioned first charging process and the above-mentioned first discharging process are arranged at different periods in an alternating manner. That is, the above-mentioned first charging process and the above-mentioned first discharging process are not performed at the same time. In this embodiment, the DC bias voltages of the first capacitors C1, C2 and C3 all are Vo. As a consequence, the first capacitors C1, C2 and C3 of this embodiment will only need to withstand a relatively lower rated voltage. Hence, this embodiment can utilize capacitors having a smaller size.

In one embodiment, the duration period of the above-mentioned first charging process is substantially equal to a specific ratio of duty cycle period. For example, the duration period of the above-mentioned first charging process is substantially equal to, for example but not limited to, 50% of the duty cycle period. Thus, the first switch can be switched at a time point where the current flowing through the first switch is at a very low level of its positive half wave, to achieve soft switching. In one embodiment, a zero current switching (ZCS) can be achieved.

In one embodiment, the above-mentioned specific ratio is correlated with the resonant frequency. In one embodiment, the above-mentioned first charging process has a first charging resonant frequency, whereas, the above-mentioned first discharging process has a first discharging resonant frequency. In one embodiment, preferably, the above-mentioned first charging resonant frequency is identical to the above-mentioned first discharging resonant frequency.

In one embodiment, the above-mentioned power converter 50 can be a bi-directional power converter. In one embodiment, the voltage conversion ratio of the input voltage Vin to the output voltage Vout of the above-mentioned power converter 50 is adjustable to be 4:1, 3:1 or 2:1. In one embodiment, the above-mentioned previous stage converter 501 is configured to operably convert the input voltage Vin to a voltage V1. In one embodiment, the previous stage converter 501 includes: a buck converter, a boost converter, a buck-boost converter, an inverting converter or an inverting-boost converter, as shown in FIGS. 12A-12J.

Figure 6:
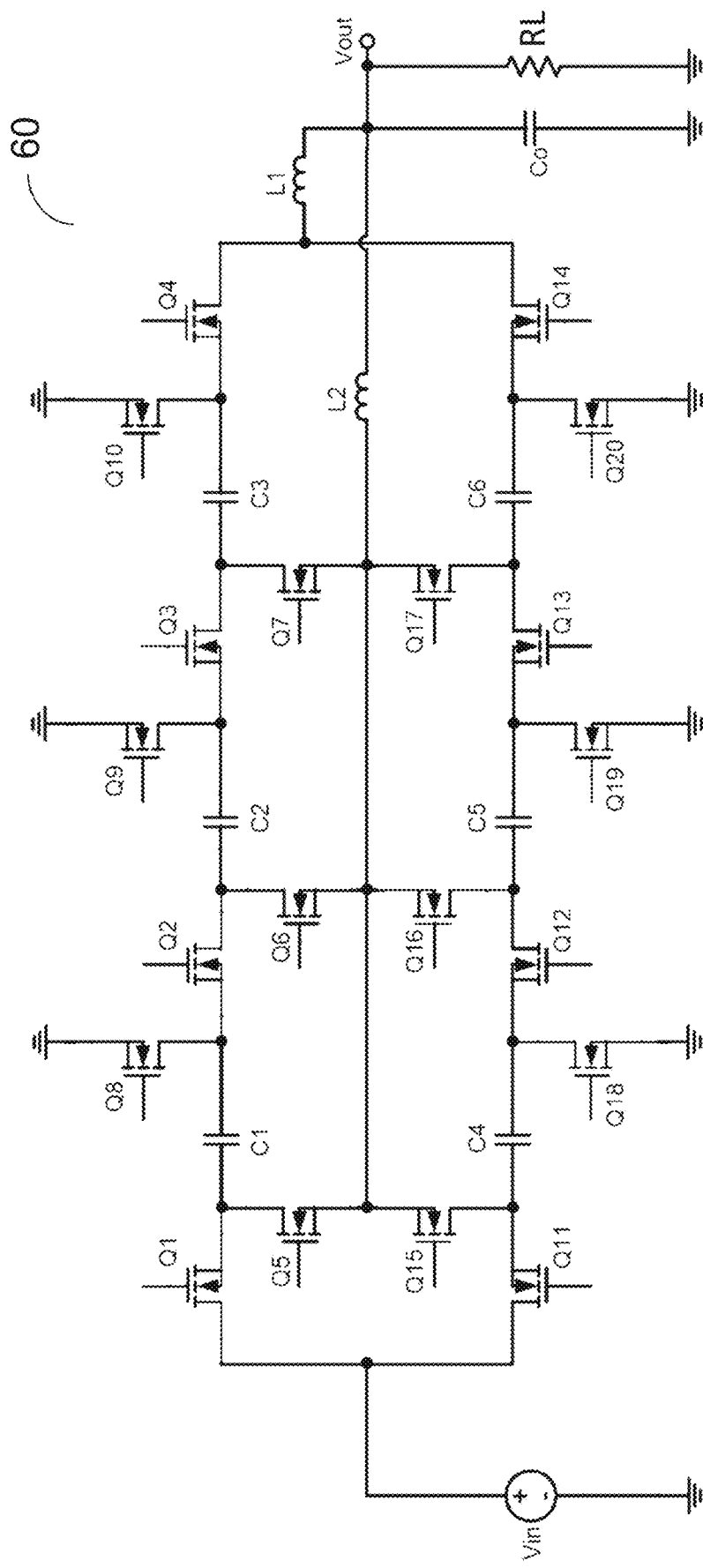
FIG. 6 shows a schematic circuit diagram of a power converter according to yet another embodiment of the present invention.

Please refer to FIG. 6, which shows a schematic circuit diagram of a power converter according to yet another embodiment of the present invention. The power converter 60 of this embodiment is an interleaving type power converter. As shown in FIG. 6, the power converter 50 of the present invention comprises: first capacitors C1, C2 and C3, second capacitors C4, C5 and C6, first switches Q1, Q2, Q3, Q4, Q5, Q6, Q7, Q8, Q9 and Q10, second switches Q11, Q12, Q13, Q14, Q15, Q16, Q17, Q18, Q19 and Q20, a charging inductor L1 and a discharging inductor L2. The first switches Q1, Q2 and Q3 are connected in series to the corresponding first capacitors C1, C2 and C3, respectively. The first switch Q4 is connected in series to the charging inductor L1. The second switches Q11, Q12 and Q13 are connected in series to the corresponding first capacitors C4, C5 and C6, respectively. The second switch Q14 is connected in series to the charging inductor L1. Certainly, it should be understood that the implementation of the number of the capacitors of the power converter 60 as six in the above-mentioned preferred embodiment is only an illustrative example, but not for limiting the broadest scope of the present invention. In other embodiments, it is also practicable and within the scope of the present invention that the number of the capacitors of the power converter 60 can be any plural number other than six. It should be understood that the number of a device in the above-mentioned preferred embodiment is only an illustrative example, but not for limiting the broadest scope of the present invention.

As shown in FIG. 6, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 6, the other ends of the first switches Q5-Q7 are commonly electrically connected to a node which is connected to the discharging inductor L2. The other ends of the switches Q8-Q10 are commonly coupled to the ground voltage level. The other ends of the charging inductor L1 and the discharging inductor L2 are commonly coupled to the output voltage Vout. The other end of the first switch Q1 is coupled to input voltage Vin.

Please still refer to FIG. 6. One end of the second switch Q15 is coupled to a node between the second switch Q11 and the second capacitor C4. One end of the second switch Q16 is coupled to a node between the second switch Q12 and the second capacitor C5. One end of the second switch Q17 is coupled to a node between the second switch Q13 and the second capacitor C6. One end of the second switch Q18 is coupled to a node between the second switch Q12 and the second capacitor C4. One end of the second switch Q19 is coupled to a node between the second switch Q13 and the second capacitor C5. One end of the second switch Q20 is coupled to a node between the second switch Q14 and the second capacitor C6. As shown in FIG. 6, the other ends of the second switches Q15-Q17 are commonly electrically connected to a node which is connected to the discharging inductor L2. The other ends of the switches Q18-Q20 are commonly coupled to the ground voltage level. The other end of the second switch Q11 is coupled to input voltage Vin.

The first switches Q1-Q10 and the second switches Q11-Q20 can switch electrical connection relationships between the first capacitors C1-C3, the second capacitors C4-C6, the charging inductor L1 and the discharging inductor L2 according to corresponding operation signals. In a first charging process, the first switches Q1-Q4 are turned ON, whereas, the first switches Q5-Q10 are turned OFF, so that a series connection of the first capacitors C1-C3 which is connected in series to the charging inductor L1 is formed between the input voltage Vin and the output voltage Vout, so as to form a first charging path. In a first discharging process, the first switches Q5-Q10 are turned ON, whereas, the first switches Q1-Q4 are turned OFF, so that a parallel connection of the capacitors C1, C2 and C3 is connected in series to the discharging inductor L2, so as to form plural first discharging paths. Please still refer to FIG. 6. In a second charging process, the second switches Q11-Q14 are turned ON, whereas, the second switches Q15-Q20 are turned OFF, so that a series connection of the second capacitors C4-C6 which is connected in series to the charging inductor L1 is formed between the input voltage Vin and the output voltage Vout, so as to form a second charging path. In a second discharging process, the second switches Q15-Q20 are turned ON, whereas, the second switches Q11-Q14 are turned OFF, so that a parallel connection of the capacitors C4, C5 and C6 is connected in series to the discharging inductor L2, so as to form plural second discharging paths. It is noteworthy that, the above-mentioned first charging process and the above-mentioned second discharging process are performed at the same time; the above-mentioned first discharging process and the above-mentioned second charging process are performed at the same time; the above-mentioned first charging process and the above-mentioned first discharging process are performed at different periods; the above-mentioned second charging process and the above-mentioned second discharging process are performed at different periods. In this embodiment, the DC bias voltages of the first capacitors C1, C2 and C3 and the second capacitors C4, C5 and C6 all are Vo. As a consequence, the first capacitors C1, C2 and C3 and the second capacitors C4, C5 and C6 of this embodiment will only need to withstand a relatively lower rated voltage. Hence, this embodiment can utilize capacitors having a smaller size.

In one embodiment, the duration period of the above-mentioned first charging process is substantially equal to a specific ratio of duty cycle period. For example, the duration period of the above-mentioned first charging process is substantially equal to, for example but not limited to, 50% of the duty cycle period. Thus, the first switch can be switched at a time point where the current flowing through the first switch is at a very low level of its positive half wave, to achieve soft switching. In one embodiment, a zero current switching (ZCS) can be achieved.

In one embodiment, the duration period of the above-mentioned first charging process is smaller than a specific ratio of duty cycle period by a first predetermined period. For example, the duration period of the above-mentioned first charging process is smaller than 50% of the duty cycle period by a first predetermined period. Thus, after the first switches Q1-Q4 have been turned OFF, a little amount of current remains to flow through the charging inductor L1 to take away accumulated charges stored in a parasitic capacitor of the first switch Q10 via a parasitic diode of the first switch Q4, so that the voltage across the first switch Q10 will be reduced, thus achieving soft switching. In one embodiment, a zero voltage switching (ZVS) can be achieved through adjusting the first predetermined period.

In one embodiment, the duration period of the above-mentioned first discharging process is larger than a specific ratio of duty cycle period by a second predetermined period. For example, the duration period of the above-mentioned first discharging process is larger than 50% of the duty cycle period by a second predetermined period. Thus, during the delayed turned-OFF period of the first switches Q5-Q10, a negative current of the discharging inductor L2 will flow through a parasitic diode of the first switch Q5 to charge a parasitic capacitor of the first switch Q1. As a result, the voltage across the first switch Q1 will be reduced, thus achieving soft switching. In one embodiment, a zero voltage switching (ZVS) can be achieved through adjusting the second predetermined period.

In one embodiment, the duration period of the above-mentioned second charging process is substantially equal to a specific ratio of duty cycle period. For example, the duration period of the above-mentioned second charging process is substantially equal to, for example but not limited to, 50% of the duty cycle period. Thus, the second switch can be switched at a time point where the current flowing through the second switch is at a very low level of its positive half wave, to achieve soft switching. In one embodiment, a zero current switching (ZCS) can be achieved.

In one embodiment, the duration period of the above-mentioned second charging process is smaller than a specific ratio of duty cycle period by a second predetermined period. For example, the duration period of the above-mentioned second charging process is smaller than 50% of the duty cycle period by a second predetermined period. Thus, after the second switches Q11-Q14 have been turned OFF, a little amount of current remains to flow through the charging inductor L1 to take away accumulated charges stored in a parasitic capacitor of the second switch Q20 via a parasitic diode of the second switch Q14, so that the voltage across the second switch Q20 will be reduced, thus achieving soft switching. In one embodiment, a zero voltage switching (ZVS) can be achieved through adjusting the second predetermined period.

In one embodiment, the duration period of the above-mentioned second discharging process is larger than a specific ratio of duty cycle period by a second predetermined period. For example, the duration period of the above-mentioned second discharging process is larger than 50% of the duty cycle period by a second predetermined period. Thus, during the delayed turned-OFF period of the second switches Q15-Q20, a negative current of the discharging inductor L2 will flow through a parasitic diode of the second switch Q15 to charge a parasitic capacitor of the second switch Q11. As a result, the voltage across the second switch Q11 will be reduced, thus achieving soft switching. In one embodiment, a zero voltage switching (ZVS) can be achieved through adjusting the second predetermined period. In one embodiment, the above-mentioned specific ratio is correlated with the resonant frequency. In one embodiment, the above-mentioned first charging process has a first charging resonant frequency, whereas, the above-mentioned first discharging process has a first discharging resonant frequency. In one embodiment, the above-mentioned second charging process has a second charging resonant frequency, whereas, the above-mentioned second discharging process has a second discharging resonant frequency. In one embodiment, preferably, the above-mentioned first charging resonant frequency is identical to the above-mentioned first discharging resonant frequency and the above-mentioned second charging resonant frequency is identical to the above-mentioned second discharging resonant frequency.

In one embodiment, the above-mentioned power converter 60 can be a bi-directional power converter. In one embodiment, a voltage conversion ratio of the input voltage Vin to the output voltage Vout of the above-mentioned power converter 60 is adjustable to be 4:1, 3:1 or 2:1. In one embodiment, the first charging resonant frequency of the power converter 60 shown in FIG. 6 is denoted as fr6, which can be represented by the following equation:

$$fr6 = \frac{1}{2\pi\sqrt{L1 \times (Cr/3)}};$$

the first discharging resonant frequency of the power converter 60 shown in FIG. 6 is denoted as fr7, which can be represented by the following equation:

$$fr7 = \frac{1}{2\pi\sqrt{L2 \times (3Cr)}}.$$

The second charging resonant frequency of the power converter 60 shown in FIG. 6 is denoted as fr8, which can be represented by the following equation:

$$fr8 = \frac{1}{2\pi\sqrt{L1 \times (Cr/3)}};$$

the second discharging resonant frequency of the power converter 60 shown in FIG. 6 is denoted as fr9, which can be represented by the following equation:

$$fr9 = \frac{1}{2\pi\sqrt{L2 \times (3Cr)}}.$$

Let it be assumed that C1=C2=C3=C4=C5=C6=Cr and if it is intended to fulfill a condition where fr6=fr7=fr8=fr9, the inductance of the inductor L2 and the inductance of the inductor L1 should comply with a relationship, which is represented by the following equation:

$$L2 = \frac{1}{9}L1.$$

Figure 7:
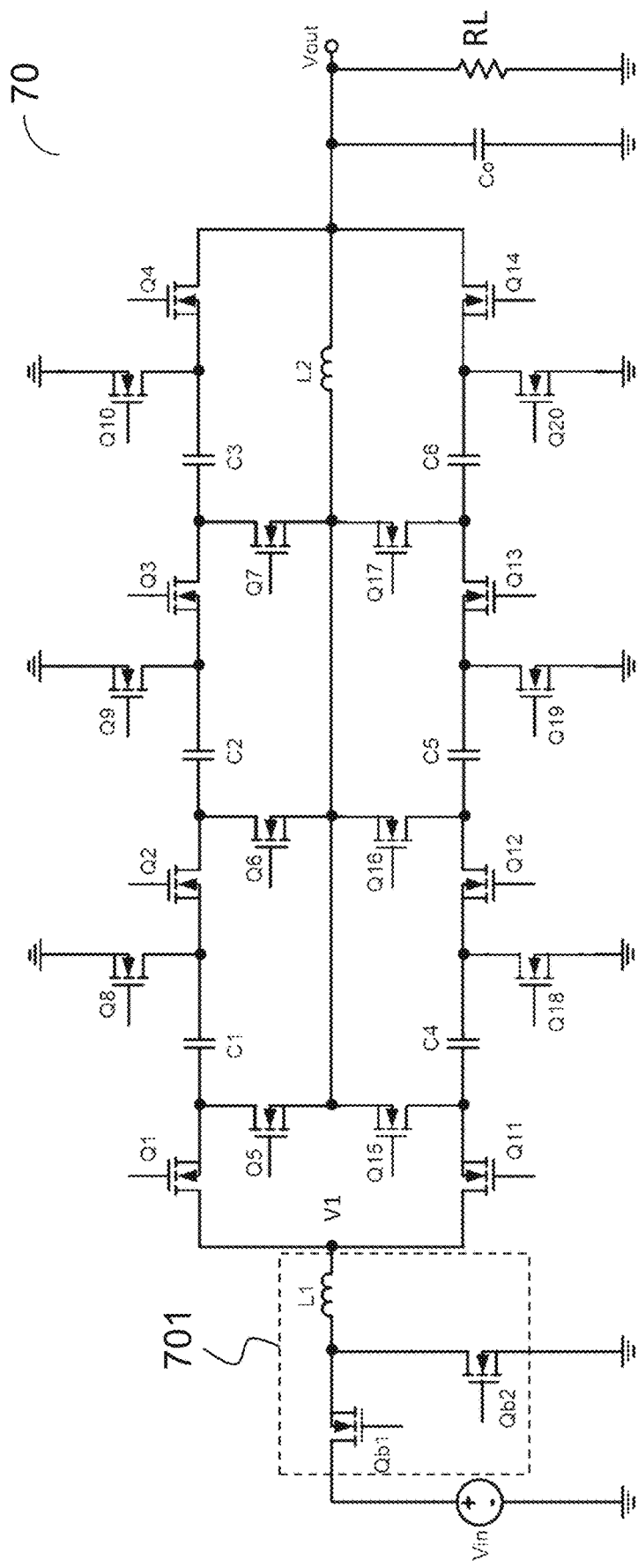
FIG. 7 shows a schematic circuit diagram of a power converter according to still another embodiment of the present invention.

Please refer to FIG. 7, which shows a schematic circuit diagram of a power converter according to still another embodiment of the present invention. The power converter 70 of this embodiment is an interleaving type power converter. As shown in FIG. 7, a charging inductor of this embodiment is moved to a position where it lies between an input voltage Vin and a first capacitor C1. Besides, this embodiment employs a previous stage inductor in a previous stage converter 701 to function as a charging inductor L1. Thus, this embodiment can reduce the number of the inductors. The power converter 70 of the present invention comprises: first capacitors C1, C2 and C3, second capacitors C4, C5 and C6, first switches Q1, Q2, Q3, Q4, Q5, Q6, Q7, Q8, Q9 and Q10, second switches Q11, Q12, Q13, Q14, Q15, Q16, Q17, Q18, Q19 and Q20, a charging inductor L1 and a discharging inductor L2. The first switches Q1, Q2 and Q3 are connected in series to the corresponding first capacitors C1, C2 and C3, respectively. The first switch Q4 is connected in series to the output voltage Vout. The second switches Q11, Q12 and Q13 are connected in series to the corresponding first capacitors C4, C5 and C6, respectively. The second switch Q14 is connected in series to the output voltage Vout. The first switch Q1 is coupled to the charging inductor L1, while, the second switch Q11 is coupled to the charging inductor L1. The other end of the charging inductor L1 is coupled to the input voltage Vin. Certainly, it should be understood that the implementation of the number of the capacitors of the power converter 70 as six in the above-mentioned preferred embodiment is only an illustrative example, but not for limiting the broadest scope of the present invention. In other embodiments, it is also practicable and within the scope of the present invention that the number of the capacitors of the power converter 70 can any plural number than six. It should be understood that the number of a device in the above-mentioned preferred embodiment is only an illustrative example, but not for limiting the broadest scope of the present invention.

As shown in FIG. 7, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 7, the other ends of the switches Q5-Q7 are commonly electrically connected to a node which is connected to the discharging inductor L2. The other ends of the switches Q8-Q10 are commonly coupled to the ground voltage level. The other end of the discharging inductor L2 is coupled to the output voltage Vout. Please still refer to FIG. 7. One end of the second switch Q15 is coupled to a node between the second switch Q11 and the second capacitor C4. One end of the second switch Q16 is coupled to a node between the second switch Q12 and the second capacitor C5. One end of the second switch Q17 is coupled to a node between the second switch Q13 and the second capacitor C6. One end of the second switch Q18 is coupled to a node between the second switch Q12 and the second capacitor C4. One end of the second switch Q19 is coupled to a node between the second switch Q13 and the second capacitor C5. One end of the second switch Q20 is coupled to a node between the second switch Q14 and the second capacitor C6. As shown in FIG. 7, the other ends of the second switches Q15-Q17 are commonly electrically connected to a node which is connected to the discharging inductor L2. The other ends of the switches Q18-Q20 are commonly coupled to the ground voltage level.

The first switches Q1-Q10 and the second switches Q11-Q20 can switch electrical connection relationships between the first capacitors C1-C3, the second capacitors C4-C6, the charging inductor L1 and the discharging inductor L2 according to corresponding operation signals. In a first charging process, the first switches Q1-Q4 are turned ON, whereas, the first switches Q5-Q10 are turned OFF, so that a series connection of the first capacitors C1-C3 which is connected in series to the charging inductor L1 is formed between the input voltage Vin and the output voltage Vout, so as to form a first charging path. In a first discharging process, the first switches Q5-Q10 are turned ON, whereas, the first switches Q1-Q4 are turned OFF, so that a parallel connection of the capacitors C1, C2 and C3 is connected in series to the discharging inductor L2, so as to form plural first discharging paths. Please still refer to FIG. 7. Ina second charging process, the second switches Q11-Q14 are turned ON, whereas, the second switches Q15-Q20 are turned OFF, so that a series connection of the second capacitors C4-C6 which is connected in series to the charging inductor L1 is formed between the input voltage Vin and the output voltage Vout, so as to form a second charging path. In a second discharging process, the second switches Q15-Q20 are turned ON, whereas, the second switches Q11-Q14 are turned OFF, so that a parallel connection of the capacitors C4, C5 and C6 is connected in series to the discharging inductor L2, so as to form plural second discharging paths. It is noteworthy that, the above-mentioned first charging process and the above-mentioned second discharging process are performed at the same time; the above-mentioned first discharging process and the above-mentioned second charging process are performed at the same time; the above-mentioned first charging process and the above-mentioned first discharging process are performed at different periods; the above-mentioned second charging process and the above-mentioned second discharging process are performed at different periods. In this embodiment, the DC bias voltages of the first capacitors C1, C2 and C3 and the second capacitors C4, C5 and C6 all are Vo. As a consequence, the first capacitors C1, C2 and C3 and the second capacitors C4, C5 and C6 of this embodiment will only need to withstand a relatively lower rated voltage. Hence, this embodiment can utilize capacitors having a smaller size.

In one embodiment, the duration period of the above-mentioned first charging process is substantially equal to a specific ratio of duty cycle period. For example, the duration period of the above-mentioned first charging process is substantially equal to, for example but not limited to, 50% of the duty cycle period. Thus, the first switch can be switched at a time point where the current flowing through the first switch is at a very low level of its positive half wave, to achieve soft switching. In one embodiment, a zero current switching (ZCS) can be achieved.

In one embodiment, the duration period of the above-mentioned second charging process is substantially equal to a specific ratio of duty cycle period. For example, the duration period of the above-mentioned second charging process is substantially equal to, for example but not limited to, 50% of the duty cycle period. Thus, the second switch can be switched at a time point where the current flowing through the second switch is at a very low level of its positive half wave, to achieve soft switching. In one embodiment, a zero current switching (ZCS) can be achieved.

In one embodiment, the above-mentioned specific ratio is correlated with the resonant frequency. In one embodiment, the above-mentioned first charging process has a first charging resonant frequency, whereas, the above-mentioned first discharging process has a first discharging resonant frequency. In one embodiment, the above-mentioned second charging process has a second charging resonant frequency, whereas, the above-mentioned second discharging process has a second discharging resonant frequency. In one embodiment, preferably, the above-mentioned first charging resonant frequency is identical to the above-mentioned first discharging resonant frequency and the above-mentioned second charging resonant frequency is identical to the above-mentioned second discharging resonant frequency.

In one embodiment, the above-mentioned power converter 70 can be a bi-directional power converter. In one embodiment, the voltage conversion ratio of the input voltage Vin to the output voltage Vout of the above-mentioned power converter 70 is adjustable to be 4:1, 3:1 or 2:1. In one embodiment, the above-mentioned previous stage converter 701 is configured to operably convert the input voltage Vin to a voltage V1. In one embodiment, the previous stage converter 701 includes: a buck converter, a boost converter, a buck-boost converter, an inverting converter or an inverting-boost converter, as shown in FIGS. 12A-12J.

Figure 8:
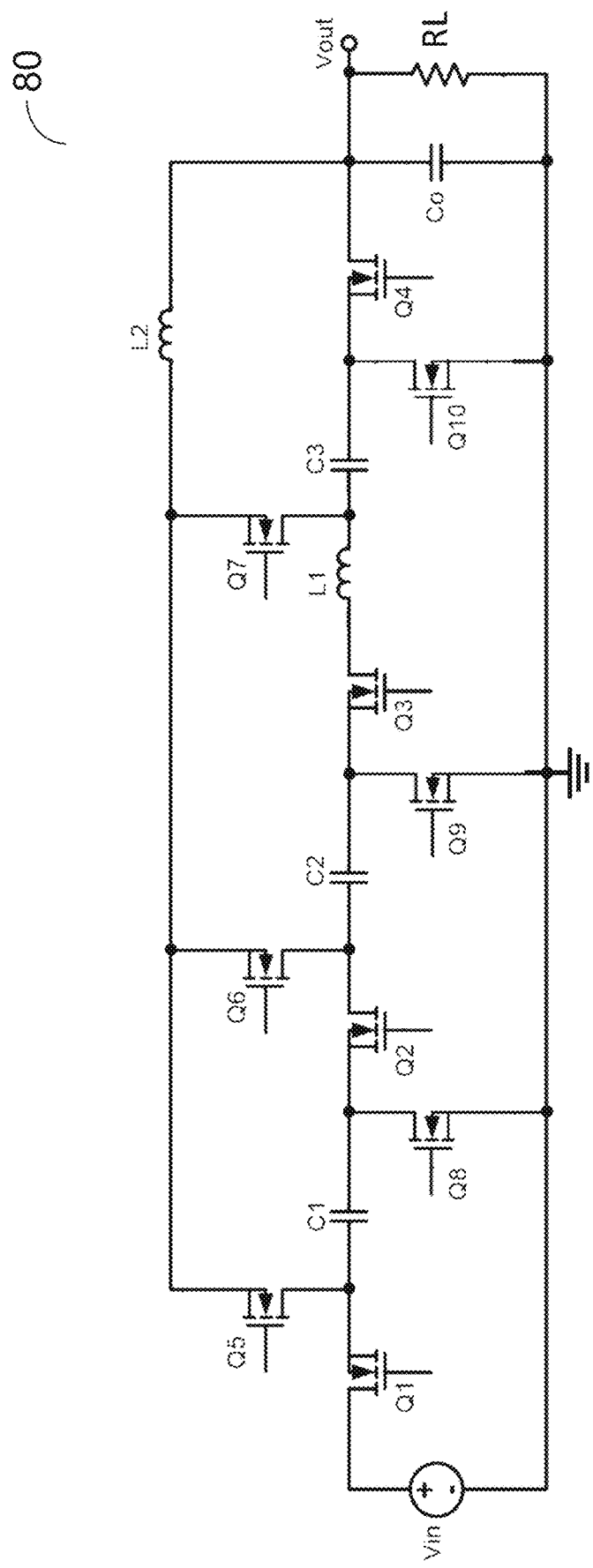
FIG. 8 shows a schematic circuit diagram of a power converter according to still another embodiment of the present invention.

Please refer to FIG. 8, which shows a schematic circuit diagram of a power converter according to still another embodiment of the present invention. This embodiment of FIG. 8 is different from the previous embodiment of FIG. 4A in that: the charging inductor L1 of this embodiment is moved to a position where it lies between the first switch Q3 and the first capacitor C3. The rest of the devices in this embodiment of FIG. 8 are similar to those in the previous embodiment of FIG. 4A, so the details thereof are not redundantly repeated here. Certainly, it should be understood that the implementation of the number of the capacitors of the power converter 80 as three in the above-mentioned preferred embodiment is only an illustrative example, but not for limiting the broadest scope of the present invention. In other embodiments, it is also practicable and within the scope of the present invention that the number of the capacitors of the power converter 80 can be any plural number other than three. It should be understood that the number of a device in the above-mentioned preferred embodiment is only an illustrative example, but not for limiting the broadest scope of the present invention.

Figure 9:
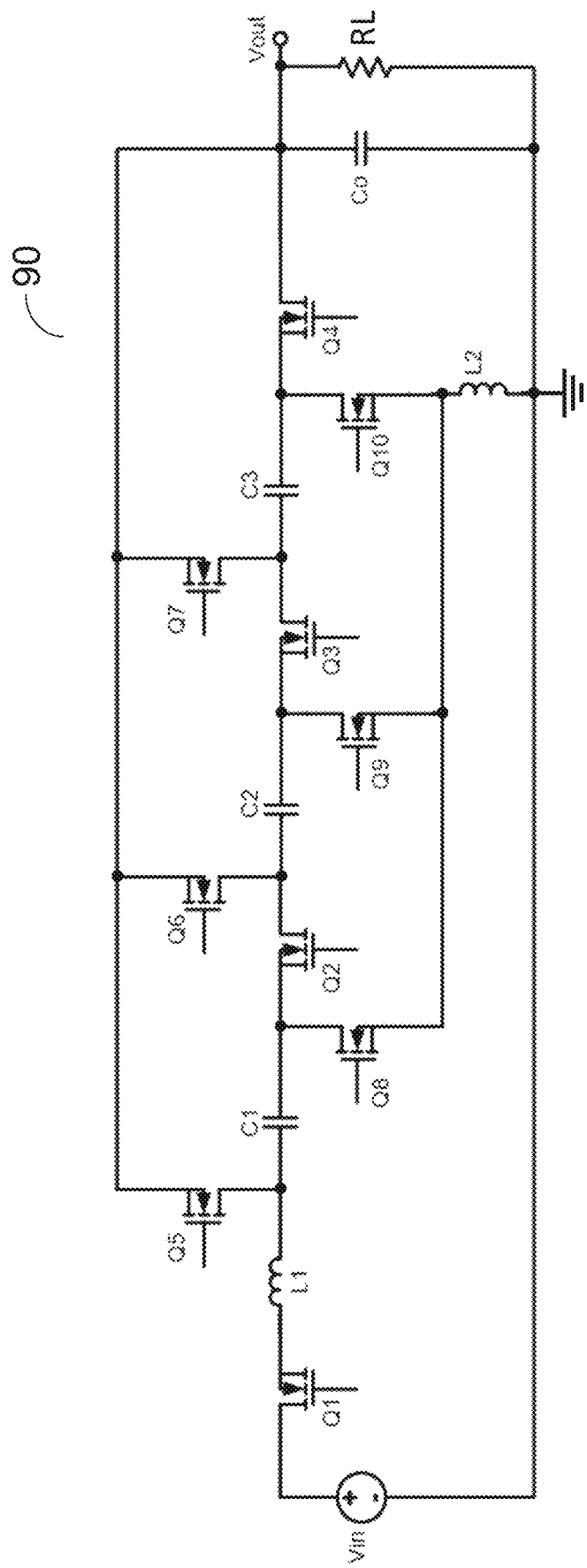
FIG. 9 shows a schematic circuit diagram of a power converter according to still another embodiment of the present invention.

Please refer to FIG. 9, which shows a schematic circuit diagram of a power converter according to still another embodiment of the present invention. This embodiment of FIG. 9 is different from the previous embodiment of FIG. 4A in that: the charging inductor L1 of this embodiment is moved to a position where it lies between the first switch Q1 and the first capacitor C1. The discharging inductor L2 of this embodiment is moved to a position where the discharging inductor L2 is connected in series to a parallel connection of the first switches Q8-Q10 (i.e., the first switches Q8-Q10 form a parallel circuit which is connected in series to the discharging inductor L2). The other end of the discharging inductor L2 is coupled to the ground voltage level. The rest of the devices in this embodiment of FIG. 9 are similar to those in the previous embodiment of FIG. 4A, so the details thereof are not redundantly repeated here. Certainly, it should be understood that the implementation of the number of the capacitors of the power converter 90 as three in the above-mentioned preferred embodiment is only an illustrative example, but not for limiting the broadest scope of the present invention. In other embodiments, it is also practicable and within the scope of the present invention that the number of the capacitors of the power converter 90 can be any plural number other than three. It should be understood that the number of a device in the above-mentioned preferred embodiment is only an illustrative example, but not for limiting the broadest scope of the present invention.

Figure 10:
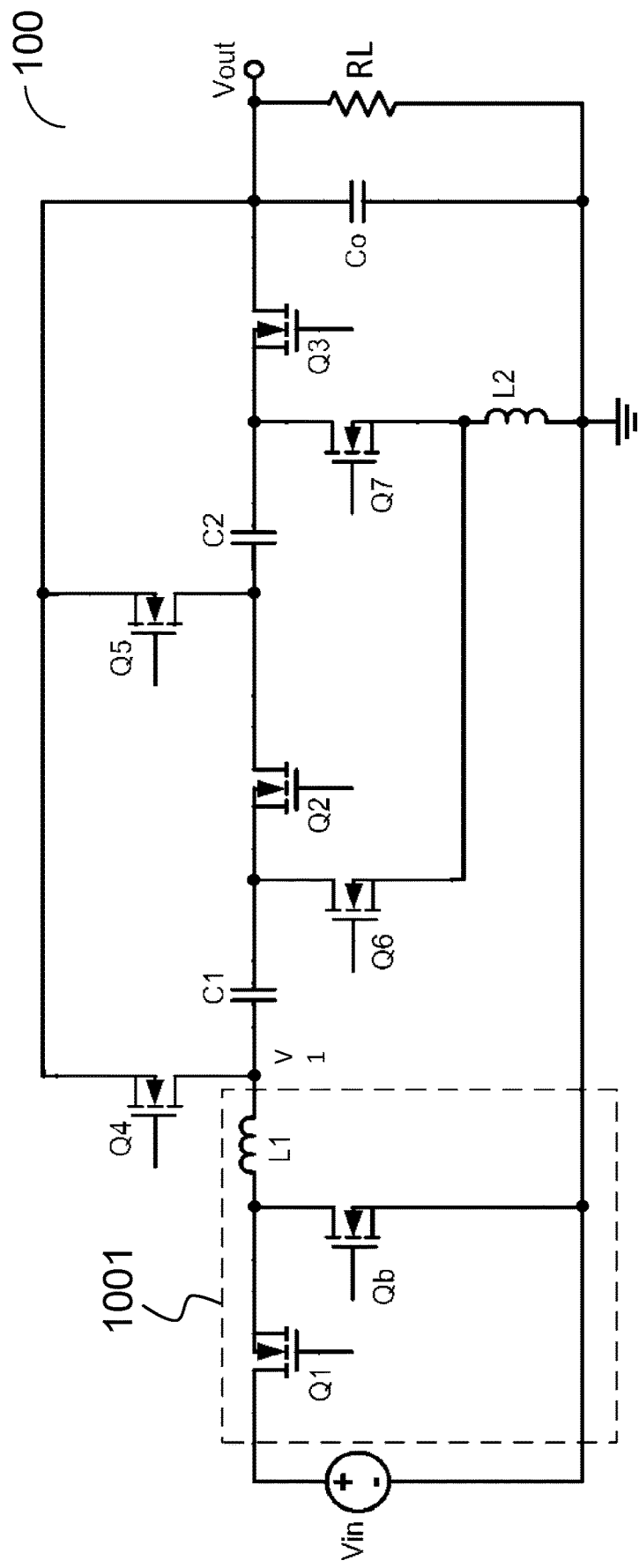
FIG. 10 shows a schematic circuit diagram of a power converter according to still another embodiment of the present invention.

Please refer to FIG. 10, which shows a schematic circuit diagram of a power converter according to still another embodiment of the present invention. The power converter 100 of this embodiment of FIG. 10 is different from the previous embodiment of FIG. 4A in that: the charging inductor L1 of this embodiment is moved to a position where it lies between the first switch Q1 and the first capacitor C1. Besides, this embodiment employs a previous stage inductor in a previous stage converter 1001 to function as the charging inductor L1 and employs a switch in the previous stage converter 1001 to function as the first switch Q1. Thus, this embodiment can reduce the number of the inductors. In addition, the discharging inductor L2 of the power converter 100 in this embodiment is moved to a position where the discharging inductor L2 is connected in series to a parallel connection of the first switches Q6-Q7 (i.e., the first switches Q6-Q7 form a parallel circuit which is connected in series to the discharging inductor L2). The other end of the discharging inductor L2 is coupled to the ground voltage level. As shown in FIG. 10, the power converter 100 of the present invention comprises: first capacitors C1 and C2, first switches Q1, Q2, Q3, Q4, Q5, Q6 and Q7, a charging inductor L1 and a discharging inductor L2. The first switches Q2 and Q3 are connected in series to the corresponding first capacitors C1 and C2, respectively. The first switch Q1 is connected in series to the charging inductor L1. Certainly, it should be understood that the implementation of the number of the capacitors of the power converter 100 as two in the above-mentioned preferred embodiment is only an illustrative example, but not for limiting the broadest scope of the present invention. In other embodiments, it is also practicable and within the scope of the present invention that the number of the capacitors of the power converter 100 can be three or more. It should be understood that the number of a device in the above-mentioned preferred embodiment is only an illustrative example, but not for limiting the broadest scope of the present invention.

As shown in FIG. 10, one end of the first switch Q4 is coupled to a node between the charging inductor L1 and the first capacitor C1. One end of the first switch Q5 is coupled to a node between the first switch Q2 and the first capacitor C2. One end of the first switch Q6 is coupled to a node between the first switch Q2 and the first capacitor C1. One end of the first switch Q7 is coupled to a node between the first switch Q3 and the first capacitor C2. As shown in FIG. 10, the other ends of the first switches Q4-Q5 are commonly electrically connected to a node which is coupled to the output voltage Vout. The other ends of the first switches Q6-Q7 are commonly electrically connected to a node which is connected to the discharging inductor L2. The other end of the discharging inductor L2 is coupled to the ground voltage level. The other end of the first switch Q1 is coupled to the input voltage Vin. The other end of the charging inductor L1 is coupled to the first capacitor C1. The other end of the first switch Q3 is coupled to the output voltage Vout.

The first switches Q1-Q7 can switch electrical connection relationships between the first capacitors C1-C2 with the charging inductor L1 and the discharging inductor L2 according to corresponding operation signals. In a first charging process, the first switches Q1-Q3 are turned ON, whereas, the first switches Q4-Q7 are turned OFF, so that a series connection of the first capacitors C1-C2 which is connected in series to the charging inductor L1 is formed between the input voltage Vin and the output voltage Vout, so as to form a first charging path. In a first discharging process, the first switches Q4-Q7 are turned ON, whereas, the first switches Q1-Q3 are turned OFF, so that a parallel connection of the capacitors C1, C2 and C3 is connected in series to the discharging inductor L2, so as to form plural first discharging paths. It is noteworthy that, in one embodiment, the above-mentioned first charging process and the above-mentioned first discharging process are performed at different periods in an alternating manner. That is, the above-mentioned first charging process and the above-mentioned first discharging process are not performed at the same time. In this embodiment, the DC bias voltages of the capacitors C1 and C2 all are Vo. As a consequence, the first capacitors C1 and C2 of this embodiment will only need to withstand a relatively lower rated voltage. Hence, this embodiment can utilize capacitors having a smaller size.

In one embodiment, the above-mentioned specific ratio is correlated with the resonant frequency. In one embodiment, the above-mentioned first charging process has a first charging resonant frequency, whereas, the above-mentioned first discharging process has a first discharging resonant frequency. In one embodiment, preferably, the above-mentioned first charging resonant frequency is identical to the above-mentioned first discharging resonant frequency.

In one embodiment, the above-mentioned power converter 100 can be a bi-directional power converter. In one embodiment, the voltage conversion ratio of the input voltage Vin to the output voltage Vout of the above-mentioned power converter 100 is adjustable to be 4:1, 3:1 or 2:1. In one embodiment, the above-mentioned previous stage converter 1001 includes: a buck converter, a boost converter, a buck-boost converter, an inverting converter or an inverting-boost converter, as shown in FIGS. 12A-12J.

Please refer to FIG. 11A, which illustrates an embodiment of waveform diagrams of operation signals and inductor currents corresponding to a charging process and a discharging process. Please refer to FIG. 11A along with FIG. 4A. In the embodiment shown in FIG. 11A, the operation signals G1~G4 corresponding to the first switches Q1~Q4 are at high level in the charging process, whereas, the operation signals G5~G10 corresponding to the first switches Q5~Q10 are at high level in the discharging process. In the embodiment shown in FIG. 11A, the duration period of the charging process is substantially equal to 50% of the duty cycle period. Thus, the first switch can be switched at a time point where the current flowing through the first switch Q1 is at a very low level of its positive half wave (i.e., at a time point where a current IL1 flowing through the charging inductor L1 is substantially equal to zero), to achieve soft switching. In one embodiment, a zero current switching (ZCS) can be achieved.

Please refer to FIGS. 11B-11C, which illustrate waveform diagrams of operation signals and inductor currents corresponding to a charging process and a discharging process. Please refer to FIG. 4A along with FIG. 11B. In the embodiment shown in FIG. 11B, the operation signals G1~G4 corresponding to the first switches Q1~Q4 are at high level in the first charging process, whereas, the operation signals G5~G10 corresponding to the first switches Q5~Q10 are at high level in the first discharging process. In the embodiment shown in FIG. 11B, the duration period of the first charging process is smaller than 50% of the duty cycle period by a predetermined period T1. Thus, after the first switches Q1-Q4 have been turned OFF, a little amount of current remains to flow through the charging inductor L1 to take away accumulated charges stored in a parasitic capacitor of the first switch Q10 via a parasitic diode of the first switch Q4, so that the voltage across the first switch Q10 will be reduced, thus achieving soft switching. In one embodiment, a zero voltage switching (ZVS) can be achieved through adjusting the predetermined period T1. Please refer to FIG. 4A along with FIG. 11C. In the embodiment shown in FIG. 11C, the operation signals G1~G4 corresponding to the first switches Q1~Q4 are at high level in the first charging process, whereas, the operation signals G5~G10 corresponding to the first switches Q5~Q10 are at high level in the first discharging process. In the embodiment shown in FIG. 11C, the duration period of the first discharging process is larger than 50% of the duty cycle period by a predetermined period T2+T3. As a result, during the delayed turned-OFF period (i.e. T2+T3) of the first switches Q5-Q10, a negative current of the discharging inductor L2 will flow through a parasitic diode of the first switch Q5 to charge a parasitic capacitor of the first switch Q1. As a result, the voltage across the first switch Q1 will be reduced, thus achieving soft switching. In one embodiment, a zero voltage switching (ZVS) can be achieved through adjusting the predetermined period T2+T3. It is noteworthy that, the embodiment of FIG. 11B and the embodiment of FIG. 11C can be implemented alone or in combination.

Figure 11D:
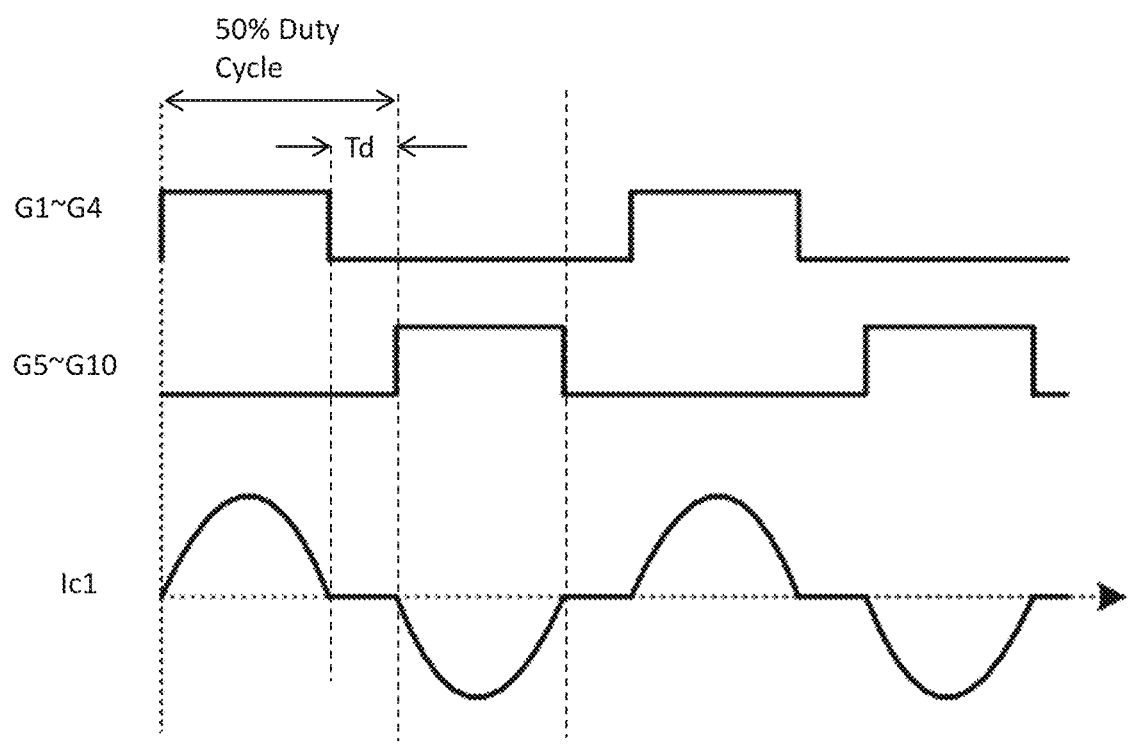
FIG. 11D illustrates waveform diagrams of operation signals and a capacitor current corresponding to a charging process and a discharging process.
Figure 12A:
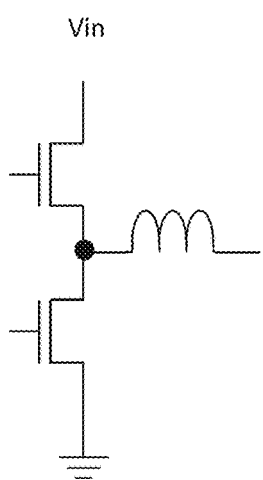
FIGS. 12A-12J show buck, boost, inverting, buck-boost and inverting-boost converters, respectively.
Figure 12B:
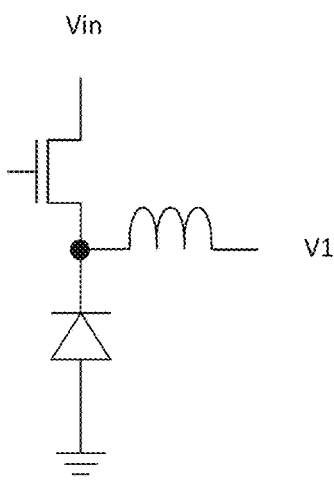
Figure 12C:
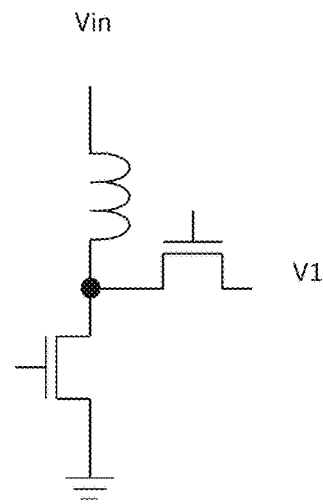
Figure 12D:
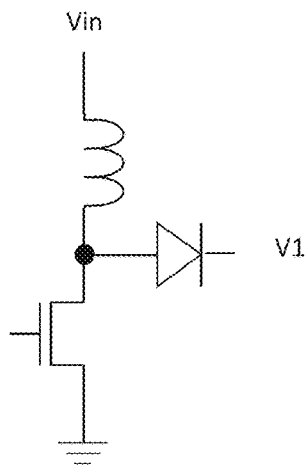
Figure 12E:
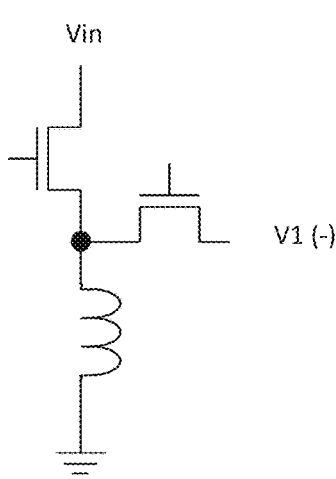
Figure 12F:
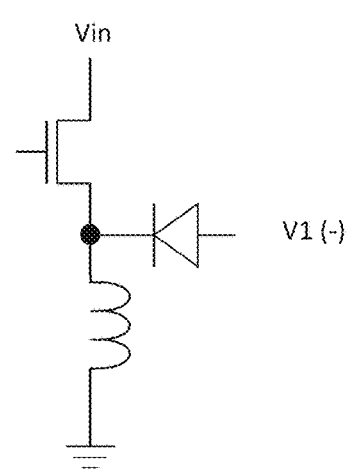
Figure 12G:
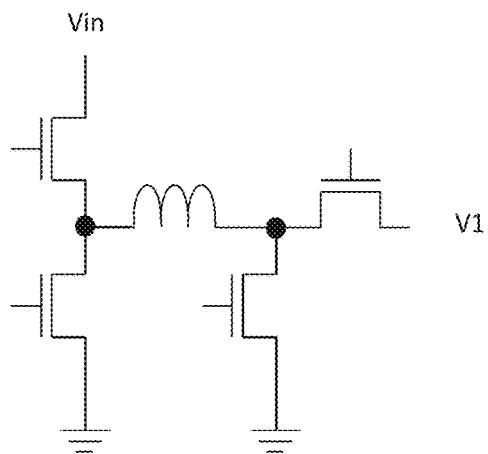
Figure 12H:
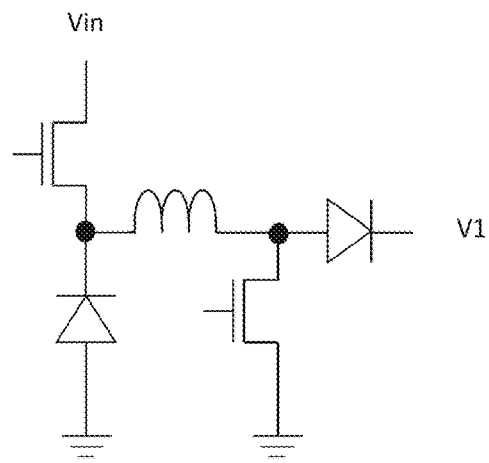
Figure 12I:
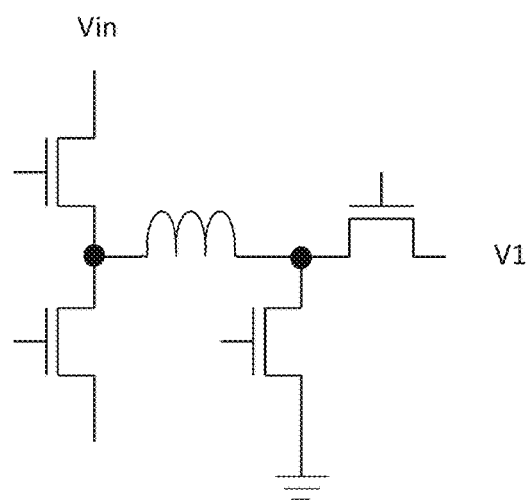
Figure 12J:
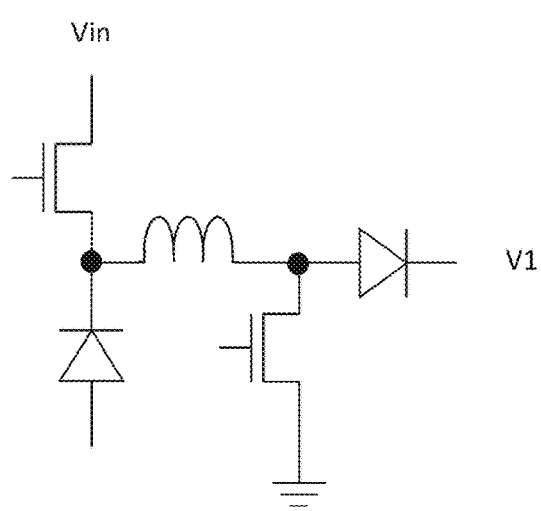

Besides, please refer to FIG. 11D, which illustrates yet another embodiment of waveform diagrams of operation signals and a capacitor current corresponding to a charging process and a discharging process. Please refer to FIG. 4A along with FIG. 11D. As shown in FIG. 11D, in this embodiment, the duration period of the charging process and the duration period of the discharging process can be modified by adding thereto a delay period Td, following after the duration period of the charging process and the duration period of the discharging process, so as to more flexibly adjust a ratio of the input voltage Vin to the output voltage Vout.

Figure 13:
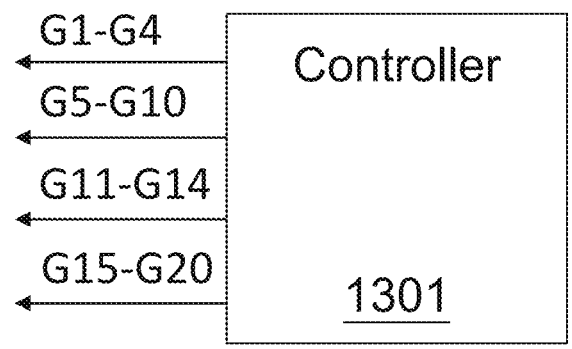
FIG. 13 shows an embodiment of a controller in a power converter.

Please refer to FIG. 13, which shows an embodiment of a controller in a power converter. As shown in FIG. 13, the power converter of the present invention can comprise a controller 1301. The controller 1301 is coupled to the first switches Q1-10 and/or the second switches Q11-20. The controller 1301 is configured to operably generate the operation signals G1-G4, G5-G10, G11-14 and G15-20, which are outputted and transmitted to the first switches Q1-Q4 and Q5-Q10 and/or the second switches Q11-Q14 and Q15-20, to operably control the first switches Q1-Q4 and Q5-Q10 and/or the second switches Q11-Q14 and Q15-20, respectively.

The present invention provides a power converter as described above, which has the following merits: reducing the number of the inductors; capable of using a relatively smaller capacitor to function as a resonant capacitor; reducing voltage stress; improving the dynamic load transient response; having good current voltage balance performance and stable resonant frequency; easier control mechanism to achieve soft switching such as zero current switching (ZCS) or zero voltage switching (ZVS); more flexible to adjust the voltage conversion ratio; broader application scope for the input voltage. Furthermore, as compared to the prior art, the present invention can more precisely control the output voltage to fall within a desired range.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power converter, which is configured to operably convert an input voltage to an output voltage; the power converter comprising:
   a plurality of first capacitors;
   a plurality of first switches, which are coupled to the plurality of first capacitors, wherein the plurality of first switches switch electrical connection relationships of the plurality of first capacitors according to corresponding first operation signals;
   at least one charging inductor, which is connected in series to at least a corresponding one of the plurality of first capacitors; and at least one discharging inductor, which is connected in series to at least a corresponding one of the plurality of first capacitors;

wherein in a first charging process, by switching the first switches, a series connection of each first capacitor and each charging inductor is formed between the input voltage and the output voltage, so as to form one single first charging path;

wherein in a first discharging process, by switching the first switches, each first capacitor and one of the at least one discharging inductor are correspondingly connected in series between the output voltage and a ground voltage level, so as to form a plurality of first discharging paths;

wherein the first charging process and the first discharging process are arranged in alternating and repetitive manner, so as to convert the input voltage to the output voltage.

2. The power converter of claim 1, wherein the at least one charging inductor includes a plurality of charging inductors, which are respectively connected in series to the plurality of first capacitors, wherein in the first charging process, by switching the first switches, a series connection of each first capacitor and each charging inductor is formed between the input voltage and the output voltage, so as to form the single first charging path; wherein in the first discharging process, the plurality of charging inductors function as the plurality of discharging inductors, so that by switching the first switches, each first capacitor and a corresponding one of the discharging inductors are correspondingly connected in series between the output voltage and the ground voltage level, so as to form the plurality of first discharging paths; wherein the plurality of first discharging paths are connected in parallel among one another.

3. The power converter of claim 1, wherein the at least one charging inductor is one single charging inductor and the at least one discharging inductor is one single discharging inductor, wherein in the first discharging process, by switching the first switches, the plurality of first capacitors form a parallel connection which is connected in series to the single discharging inductor.

4. The power converter of claim 3, further comprising:
a previous stage converter including a previous stage inductor, wherein the previous stage inductor is configured to operably function as the charging inductor.

5. The power converter of claim 4, wherein the previous stage converter includes: a buck converter, a boost converter, a buck-boost converter, an inverting converter or an inverting-boost converter.

6. The power converter of claim 1, further comprising:
a plurality of second capacitors;
a plurality of second switches, which are coupled to the plurality of second capacitors, wherein the plurality of second switches switch electrical connection relationships of the plurality of second capacitors according to corresponding second operation signals;

wherein the at least one charging inductor is connected in series to at least one of the plurality of second capacitors; and wherein the at least one discharging inductor is connected in series to at least one of the plurality of second capacitors;

wherein in a second charging process, by switching the second switches, a series connection of the plurality of the second capacitors and the at least one charging inductor is formed between the input voltage and the output voltage, so as to form a second charging path;

wherein in a second discharging process, by switching the second switches, each second capacitor and one of the at least one discharging inductor are correspondingly connected in series between the output voltage and a ground voltage level, so as to form a plurality of second discharging paths;

wherein the second charging process and the second discharging process are arranged in alternating and repetitive manner, so as to convert the input voltage to the output voltage;

wherein when the power converter is in the first charging process, the power converter executes the second discharging process;

wherein when the power converter is in the first discharging process, the power converter executes the second charging process.

7. The power converter of claim 6, wherein the second charging process has a second charging resonant frequency, whereas, the second discharging process has a second discharging resonant frequency, and wherein the second charging resonant frequency is identical to the second discharging resonant frequency.

8. The power converter of claim 6, wherein a duration period of the second charging process is equal to a duration period of the second discharging process, so that a zero current switching of soft switching is achieved.

9. The power converter of claim 6, wherein a zero voltage switching of soft switching is achieved through adjusting a duration period of the second charging process.

10. The power converter of claim 6, wherein a zero voltage switching of soft switching is achieved through adjusting a duration period of the second discharging process.

11. The power converter of claim 6, wherein a duration period of the second charging process does not overlap with a duration period of the second discharging process.

12. The power converter of claim 1, wherein the first charging process has a first charging resonant frequency, whereas, the first discharging process has a first discharging resonant frequency, and wherein the first charging resonant frequency is identical to the first discharging resonant frequency.

13. The power converter of claim 1, wherein a duration period of the first charging process is equal to a duration period of the first discharging process, so that a zero current switching of soft switching is achieved.

14. The power converter of claim 1, wherein a zero voltage switching of soft switching is achieved through adjusting a duration period of the first charging process.

15. The power converter of claim 1, wherein a zero voltage switching of soft switching is achieved through adjusting a duration period of the first discharging process.

16. The power converter of claim 1, wherein the power converter is a bi-directional power converter.

17. The power converter of claim 1, wherein a voltage conversion ratio of the input voltage to the output voltage of the power converter is adjustable to be 4:1, 3:1 or 2:1.

18. The power converter of claim 1, wherein a duration period of the first charging process does not overlap with a duration period of the first discharging process.

19. The power converter of claim 1, further comprising:
a controller, which is coupled to the plurality of first switches, wherein the controller is configured to operably generate the first operation signals.

* * * * *